(12) United States Patent
Barros

(10) Patent No.: US 8,843,850 B2
(45) Date of Patent: Sep. 23, 2014

(54) GRAPHIC-INFORMATION FLOW FOR VISUALLY ANALYZING PATTERNS AND RELATIONSHIPS

(75) Inventor: Barbara L Barros, Boston, MA (US)

(73) Assignee: Tavusi Data Solutions LLC, Wilmington, DE (US)

(*) Notice: Subject to any disclaimer, the term of this patent is extended or adjusted under 35 U.S.C. 154(b) by 224 days.

(21) Appl. No.: 12/549,950

(22) Filed: Aug. 28, 2009

(65) Prior Publication Data

US 2010/0017733 A1  Jan. 21, 2010

Related U.S. Application Data

(63) Continuation of application No. 11/329,419, filed on Jan. 11, 2006, which is a continuation-in-part of application No. 10/007,387, filed on Oct. 22, 2001, now Pat. No. 7,036,085, which is a continuation of application No. 09/359,544, filed on Jul. 22, 1999, now Pat. No. 6,307,573.

(60) Provisional application No. 60/644,987, filed on Jan. 21, 2005, provisional application No. 60/642,537, filed on Jan. 11, 2005.

(51) Int. Cl.
  *G06F 3/048* (2013.01)

(52) U.S. Cl.
  USPC .......................................................... 715/810

(58) Field of Classification Search
  USPC ......... 715/205, 209, 230, 233, 234, 705, 711, 715/712, 713, 714, 734, 760, 808, 809, 810, 715/821, 823, 825, 828, 835, 838, 845, 846, 715/848, 850, 851, 864; 345/428, 619, 629, 345/630, 641, 642; 707/919, 920; 701/200, 701/208; 434/150, 151, 153
  See application file for complete search history.

(56) References Cited

U.S. PATENT DOCUMENTS

| | | | |
|---|---|---|---|
| 5,030,117 A | 7/1991 | Delorme | |
| 5,150,295 A | 9/1992 | Mattingly | |
| 5,457,812 A | 10/1995 | Siira et al. | |
| 5,475,812 A | 12/1995 | Corona et al. | |
| 5,537,324 A * | 7/1996 | Nimura et al. | 701/208 |
| 5,549,332 A | 8/1996 | Judson | |
| 5,555,354 A | 9/1996 | Strasnick et al. | |
| 5,559,707 A * | 9/1996 | DeLorme et al. | 701/200 |
| 5,574,648 A | 11/1996 | Pilley | |
| 5,592,604 A | 1/1997 | Marusak | |

(Continued)

FOREIGN PATENT DOCUMENTS

WO  WO-01-08053  2/2001

OTHER PUBLICATIONS

"Final Office Action", U.S. Appl. No. 11/329,419, (Mar. 19, 2010), 17 pages.

(Continued)

*Primary Examiner* — Enrique Iturralde
(74) *Attorney, Agent, or Firm* — Perkins Coie LLP

(57) ABSTRACT

A display control and information management system seamlessly integrates layered and slotted formatted data from local and remote sources to provide a highly versatile information display. The system permits selective control of display and display features so that complex data and data flows can be seamlessly accessed with enhanced cognition of salient information by a user.

21 Claims, 40 Drawing Sheets

(56) References Cited

U.S. PATENT DOCUMENTS

| | | | |
|---|---|---|---|
| 5,596,500 A | | 1/1997 | Sprague et al. |
| 5,627,959 A | * | 5/1997 | Brown et al. ............... 715/853 |
| 5,699,244 A | * | 12/1997 | Clark et al. ................. 702/2 |
| 5,706,417 A | | 1/1998 | Adelson |
| 5,710,899 A | | 1/1998 | Eick |
| 5,729,731 A | * | 3/1998 | Yajima et al. ............... 1/1 |
| 5,774,669 A | | 6/1998 | George et al. |
| 5,781,773 A | * | 7/1998 | Vanderpool et al. .......... 707/693 |
| 5,784,059 A | * | 7/1998 | Morimoto et al. ........... 715/854 |
| 5,806,018 A | | 9/1998 | Smith et al. |
| 5,839,080 A | | 11/1998 | Muller |
| 5,864,337 A | * | 1/1999 | Marvin ..................... 715/708 |
| 5,867,804 A | | 2/1999 | Pilley |
| 5,870,559 A | * | 2/1999 | Leshem et al. ............. 709/224 |
| 5,870,689 A | * | 2/1999 | Hale et al. ................. 702/5 |
| 5,894,311 A | | 4/1999 | Jackson |
| 5,905,508 A | | 5/1999 | Beitel |
| 5,910,803 A | | 6/1999 | Grau et al. |
| 5,912,674 A | | 6/1999 | Magarshak |
| 5,919,242 A | * | 7/1999 | Greatline et al. ............ 701/50 |
| 6,038,522 A | * | 3/2000 | Manson et al. ............. 702/150 |
| 6,094,586 A | | 7/2000 | Nishiyama et al. |
| 6,240,360 B1 | * | 5/2001 | Phelan ...................... 701/208 |
| 6,243,094 B1 | | 6/2001 | Sklar |
| 6,307,573 B1 | | 10/2001 | Barros |
| 6,408,307 B1 | * | 6/2002 | Semple et al. .............. 1/1 |
| 7,036,085 B2 | | 4/2006 | Barros |
| 2001/0019332 A1 | | 9/2001 | Fisher |
| 2001/0043210 A1 | | 11/2001 | Gilbert et al. |
| 2006/0174209 A1 | | 8/2006 | Barros |
| 2009/0138826 A1 | | 5/2009 | Barros |

OTHER PUBLICATIONS

Kraak, M-J "Integrating Multimedia in geographical information systems", *IEEE Multimedia IEEE Computer Society*, US, vol. 3 (2), (Jun. 1, 1996), pp. 59-65.

Voisard, A "Mapgets: a tool for visualizing and querying geographic information", *Journal of Visual Languages and Computing*, London, GB, XP002239444, (1995), vol. 6, No. 4, pp. 367-384.

"Non Final Office Action", U.S. Appl. No. 11/329,419, (May 26, 2009), 32 pages.

"Advisory Action", U.S. Appl. No. 11/329.419, (May 26, 2010), 3 pages.

"PCT International Search Report", Application PCT/US00/40412, (Oct. 8, 2003), 5 pages.

International Preliminary Examination Report, PCT/US2000/040412, Apr. 3, 2009, 4 pages.

United States Patent and Trademark Office, Notice of Allowance, U.S. Appl. No. 09/359,544, mailed Jun. 21, 2001, 14 pages.

United States Patent and Trademark Office, Non-Final Office Action, U.S. Appl. No. 10/007,387, mailed May 27, 2004, 5 pages.

United States Patent and Trademark Office, Final Office Action, U.S. Appl. No. 10/007,387, mailed Apr. 4, 2005, 14 pages.

United States Patent and Trademark Office, Notice of Allowance, U.S. Appl. No. 10/007,387, mailed Nov. 17, 2005, 12 pages.

United States Patent and Trademark Office, Non-Final Office Action, U.S. Appl. No. 12/264,096, mailed Feb. 22, 2011, 21 pages.

United States Patent and Trademark Office, Final Office Action, U.S. Appl. No. 12/264,096, mailed Oct. 28, 2011, 22 pages.

United States Patent and Trademark Office, Advisory Action, U.S. Appl. No. 12/264,096, mailed Jan. 13, 2012, 4 pages.

United States Patent and Trademark Office, Restriction Requirement, U.S. Appl. No. 11/329,419, mailed Apr. 10, 2008, 7 pages.

United States Patent and Trademark Office, Non-Final Office Action, U.S. Appl. No. 11/329,419, mailed Oct. 15, 2008, 32 pages.

United States Patent and Trademark Office, Interview Summary, U.S. Appl. No. 11/329,419, mailed Nov. 26, 2008, 4 pages.

United States Patent and Trademark Office, Interview Summary, U.S. Appl. No. 11/329,419, mailed Aug. 6, 2009, 2 pages.

United States Patent and Trademark Office, Non-Final Office Action, U.S. Appl. No. 11/329,419 mailed Jan. 5, 2011, 21 pages.

United States Patent and Trademark Office, Final Office Action, U.S. Appl. No. 11/329,419, mailed Jul. 21, 2011, 21 pages.

United States Patent and Trademark Office, Restriction Requirement, U.S. Appl. No. 12/264,096, mailed Jun. 11, 2013, 7 pages.

United States Patent and Trademark Office, Final Office Action, U.S. Appl. No. 12/264,096, mailed Oct. 10, 2013, 12 pages.

United States Patent and Trademark Office, Notice of Allowance, U.S. Appl. No. 11/329,419, mailed Jul. 19, 2012, 13 pages.

United States Patent and Trademark Office, Non-Final Office Action, U.S. Appl. No. 12/264,096, mailed Nov. 28, 2012, 29 pages.

United States Patent and Trademark Office, Notice of Allowance, U.S. Appl. No. 11/329,419, mailed Dec. 26, 2012, 14 pages.

* cited by examiner primary command and data flow
between the client and the server

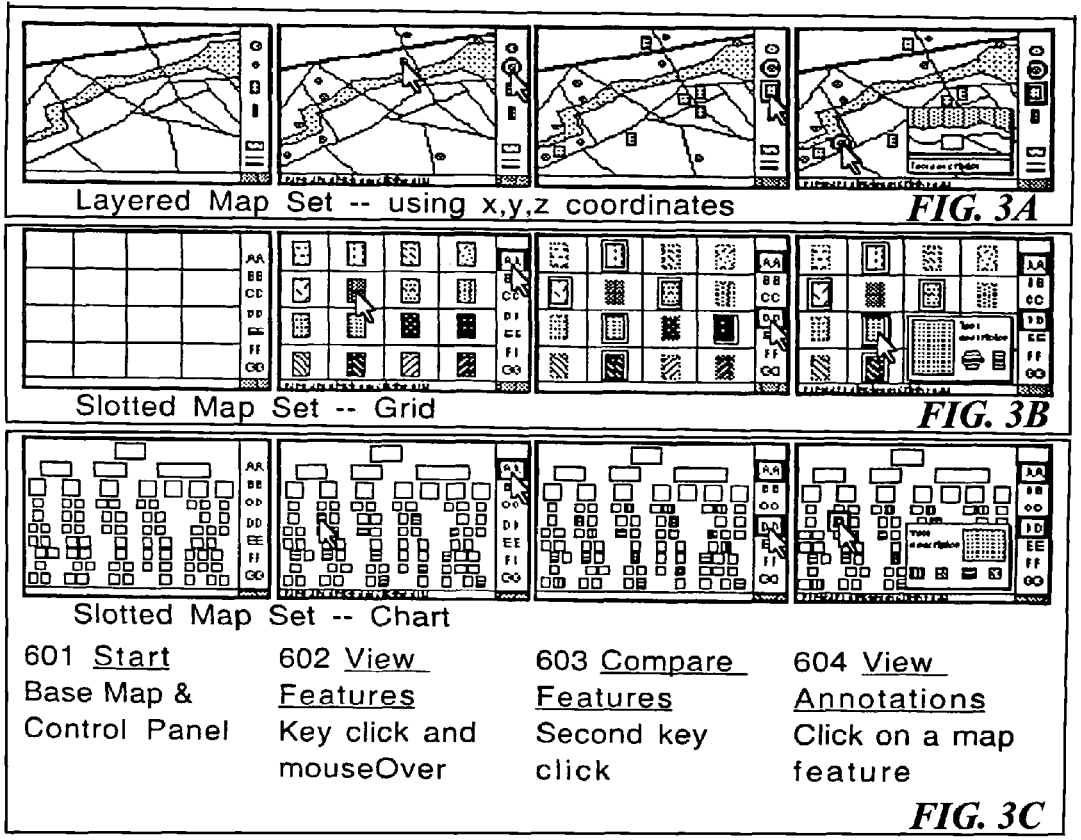
FIG. 3A Layered Map Set -- using x,y,z coordinates
FIG. 3B Slotted Map Set -- Grid
FIG. 3C Slotted Map Set -- Chart
601 Start
Base Map & Control Panel
602 View Features
Key click and mouseOver
603 Compare Features
Second key click
604 View Annotations
Click on a map feature 6905 Pop-up for Query

| Subtopic | ☐ plot query | ← 6304 |
|---|---|---|
| attribute 5.1 | Selections: | |
| attribute 5.2 | attribute 2.3 | |
| attribute 5.3 | attribute 3.1 | |
| 6302 → attribute 5.4 | attribute 3.4 | |
| attribute 5.5 | attribute 5.5 | ← 6303 |
| attribute 5.6 | | |
| attribute 5.7 | | |
| attribute 5.8 | | |

Pop-up ad integrated with map content as pop-up storybook.

Pop-up ad integrated with map content as pop-up storybook.

Product offerings integrated with map content

Product catalog in slotted map.

FIG. 9D

Product catalog in slotted map with pop-up.

FIG. 9E

Interactive map-format user-activity report

10001 All Framework components fully-visible on the screen.

10002 GUI Framework Components

| name | sun | soil | height | spacing | water | feed | pests | pH |
|------|-----|------|--------|---------|-------|------|-------|-----|
| pan1 | full | 1 | 24-30" | 12" | 2 | a,b | a,d | 7. |
| pan2 | par | 2 | 24-30" | 12" | 2 | b | c,d | 6. |
| pan3 | par | 3 | 24-36" | 18" | 1 | a,c | c | 6. |
| pos1 | full | 1 | 12-18" | 8-12" | 1 | c | a,c | 6. |
| pos2 | sh | 1 | 18-24" | 18" | 2 | a | b,d | 6. |
| pos3 | full | 2 | 12-18" | 8-12" | 1 | a,b | b,d | 5. |
| pos4 | sh | 2 | 24-36" | 12" | 3 | a,b | b,d | 6. |
| rill1 | par | 2 | 6-12" | 10" | 2 | a,c | a,d | 8. |
| rill2 | full | 2 | 6-12" | 10" | 1 | c | a,c | 8. |
| rill3 | full | 2 | 12-18" | 12" | 2 | a,b | b | 8. |
| rill4 | par | 1 | 6-12" | 12" | 2 | a,b | b,d | 8. |

10003 Portion of Topical Database

10004 Slotted Map – Horizontal Timeline

10005 Layered Map – Garden Rows

10006 Slotted and Layered Graphic Map

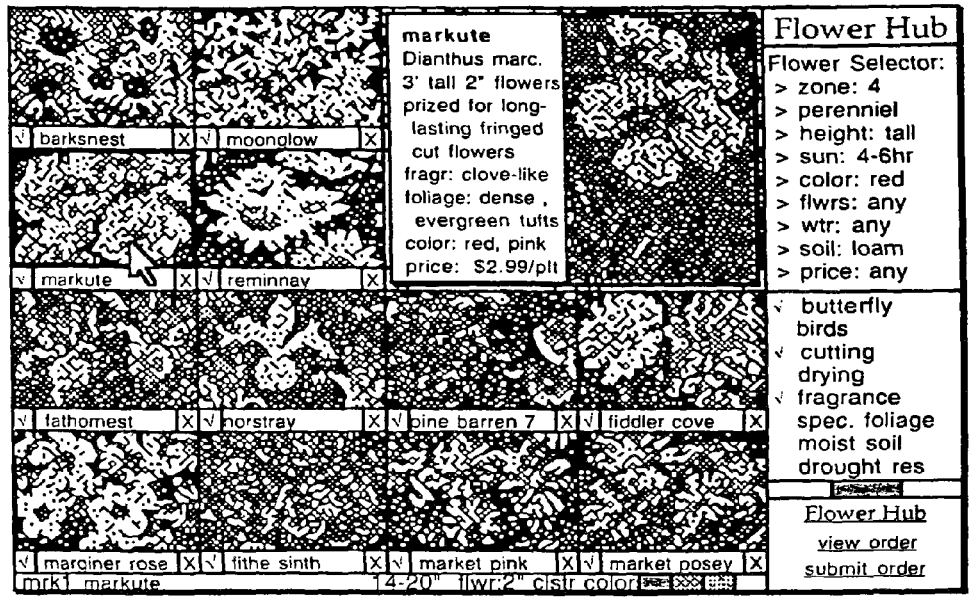
10007 Slotted Map with gridded matrix and pop-up storybook   FIG. 10G
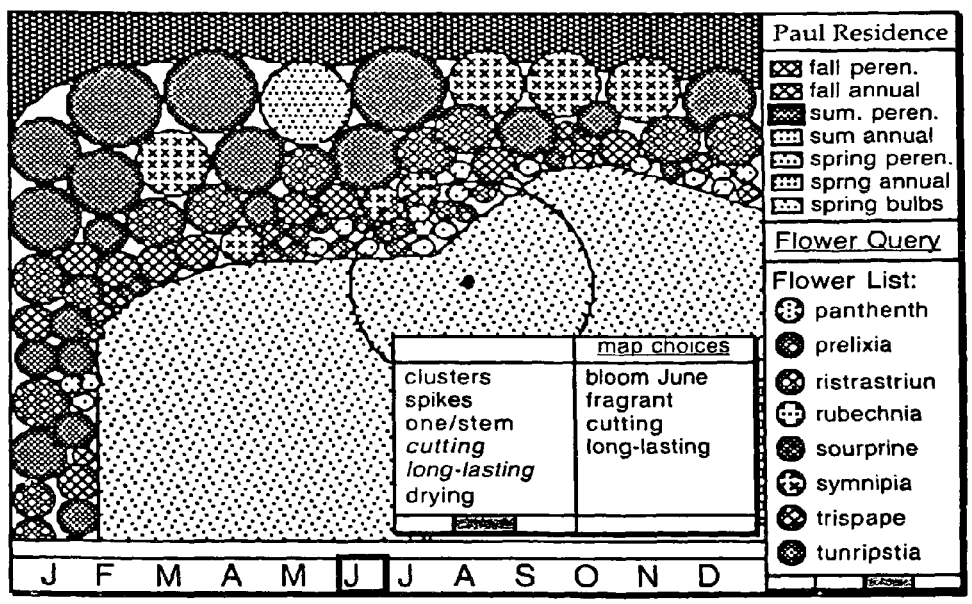
10008 Layered and Slotted Map with pop-up query box   FIG. 10H

OnlineShoppingSite.com 🛒 Show Cart

My Collections
> Desk Lamp
Dining Room
Gail Birthday
Hall Carpet
Kitchen Tile

| D-K | L-W |

Save Collection

Search:
[ ]

[ ] -$100
[X] $100-200
[ ] $200-400
[ ] $400+

By Room
Living Room
Kitchen
Dining Room
Bedroom
Bathroom

Indoor
Storage
Linens
Tableware
Fireplace
> Lighting
Artwork
Curtains
Flooring

Outdoor
Furniture
Lighting
Sculpture
Paving

My Search Collection — Clear Collection
Rising Oaks by Premnia $157 — Clear Collection Show my Collection in 1 page.
Send checked to Cart.

Indoor>Lighting>Table Lamps>$100-200

Go to lamp pages: 1 2 3 4 5 Next>

Ancient Aviary by Vinkster $123 — ☑ Save in my Collection *Order Now*

Oxford Brass by Imprestar $123 — ☑ Save in my Collection *Order Now*

Daphine by Prenmia $123 — ☑ Save in my Collection *Order Now*

Fleurdelabra by Murchler $189 — ☑ Save in my Collection *Order Now*

Chamber by Murchler $132 — ☑ Collected *Order Now*

V Double by Imprestar $169 — ☑ Save in my Collection *Order Now*

Dachler Crystal by Murchler $138 — ☑ Save in my Collection *Order Now*

Arts&Craft by Imprestar $124 — ☑ Put back in Collection *Order Now*

Konler Rust by Murchler $135 — ☑ Save in my Collection *Order Now*

Ebony Urn by Norso $132 — ☑ Save in my Collection *Order Now*

GRAPHIC-INFORMATION FLOW FOR VISUALLY ANALYZING PATTERNS AND RELATIONSHIPS

RELATED DOCUMENT INFORMATION

This application is a continuation of and claims priority to U.S. patent application Ser. No. 11/329,419 filed on Jan. 11, 2006 which, in turn, is a continuation-in-part application of and claims priority to U.S. Pat. No. 7,036,085 and U.S. Provisional Patent Application No. 60/642,537 filed on Jan. 11, 2005, and U.S. Provisional Patent Application No. 60/644,987 filed on Jan. 21, 2005. U.S. Pat. No. 7,036,085, in turn, is a continuation of and claims priority to U.S. Pat. No. 6,307,573. The entire disclosures of the above-referenced documents are hereby incorporated by reference in this application.

BACKGROUND

Throughout the ages, humans have devised ways to record, then examine, their thoughts and mental images on paper. People draw depictions of events, places, projects, and sets of objects. They chart scientific processes, demographics, weather conditions, and mechanical systems; and they diagram organizations, trade routes, music, and inventions. These drawings aid both the originator and subsequent audiences in picturing spatial or symbolic relationships. Paper drawings and maps are representations of the real world; but often the viewer must struggle to see only what is relevant amidst too much information. Transparent overlays can separate graphic information, but are cumbersome and restrictive. Reference documents such as catalogues, guide books, atlases, and encyclopedias gather together images and text descriptions; but the user must flip back and forth between pages to find, link, and compare information.

Today, computers are now being used to generate, compile, and retrieve such graphic records. However, they have not as yet enabled viewers to smoothly call forth sets of graphic data to inform and stimulate a sustained, multi-faceted, analytical thought process. For example, computer programs that employ graphics layering are currently used to generate illustrations (computer graphics), drawings of designs (CADD), and searchable and thematic geographic maps (GIS).

Computer graphics can be used to draw lines and shapes which may be organized into layers for overlapping and for showing and hiding before being output as a printed or digital illustration. CADD (Computer-Aided Design and Drafting) is used to create plans of products, vehicles, buildings, utility systems, and other three-dimensional objects. CADD employs layering technology to draft and show different views of a three-dimensional object. A GIS (Geographic Information System) plots data on a map with layers of points, lines, and polygons representing land features. Each GIS feature has an entry in a database with its name, a set of coordinates (which may be real-world latitude and longitude) for positioning the feature on the screen, and attribute data which may be shown in a separate window and queried to determine a set of features to be displayed.

These graphics-making programs are used primarily by technicians to produce a singular image for publication and, in limited ways, for interactive analysis. However, non-technicians—the public, executives, and experts in non-computer fields—cannot use them to easily access and manipulate selections of layered materials. Nor can they easily create or assemble their own sets of interactive, layered data.

GIS (Geographic Information Systems) has come furthest in adding interactivity to computer-generated images. Drop-down menus, graphics tools, and palettes are used for customized map production; this slow, unwieldy process is of very limited use for multi-faceted analysis. Networked GIS is used within corporate and government intranets to provide staff access to data displayed on geographic maps; it is also used on World Wide Web sites for the public to find a street address or the location of one particular facility or type of facility (see "Serving Maps on the Internet," by Christian Harder, 1998, Environmental Systems Research Institute, Inc., Redlands, Calif., incorporated herein by reference as if restated in full.) In addition to searching for addresses and facilities, the interactive capabilities of current online GIS include zooming in and out and panning within a large digital map file.

A typical GIS often also has a large database with thematic information for places on the map. However, current GIS does not provide for seamless access to subset combinations from extensive data sets. A legend, table of contents, or key shows a small selection of themes and the symbols associated with subsets within each theme. In some cases, entire themes may be shown or hidden by clicking a check box next to the theme title on the legend; however, a particular subset within a theme cannot be shown or hidden. Current online GIS interfaces rely on the scrolling of palette scroll bars to extend the legend and to view selections for queries; this scrolling breaks the flow of data selection and severely limits the organization and amount of data that can be accessed. Sometimes scrolling is also required to view the entire map and each subsequent iteration, further breaking the flow of the analytical thought process. Annotational information, when available, is provided by going to a separate Web page or window; and thereby the material is not viewed smoothly, in direct association with the map feature.

Beyond layering software, another relevant computer technology is hypermedia. Hypermedia is the "linking" technology for instantly retrieving text, images, or sounds. Its "smart" graphics respond to commands such as mouse clicks to "hypertext" or to a "hot" symbol on the computer screen (often referred to as a button, object, icon, or imagemap).

From 1990 to 1993, the inventor developed a hypermedia map-making software program ("CityView/TownView HyperMapping—making maps and map libraries on your computer. A Journal of Demonstration Projects" and software manual, self-published, by Barbara L. Barros, Boston 1994, incorporated herein by reference). This program provided an interactive tutorial and tool with which novice computer-users could make their own map libraries for a study of their neighborhoods, cities, or towns. The software program used the first widely available hypermedia software development tools; APPLE COMPUTER INC.'s two-layered HYPERCARD. On the background layer of the map-making software was a base map either drawn by the user or imported as a scan or GIS-generated bitmap graphic. The user rendered sets of information on separate top layers using paint (raster or bitmap) graphics, text fields, and buttons which could link to new maps, paint layers, and text. The overlays were automatically indexed in a directory from which users could select layers to combine on a new, aggregated map. However, the layers were then fused together, so the map could not be used to aid a flowing analytical thought process.

The primary intent of the "CityView/TownView" map-making software was to enable civil servants and citizens to engage in exercises through which they could improve their awareness of local planning issues and opportunities. The software had several significant limitations: (1) the map features were not objects and could not have data or scripts attached to them, (2) map graphics could only be in black and white which reduced legibility and appeal, (3) the software was dependent on APPLE's MACINTOSH operating system having limited distribution, (4) users tended not to have or be able to afford base map data, and (5) the large amounts of graphic data generated could not be stored on most personal computers or shared easily with others.

CD-ROMs and the World Wide Web are, at this time, the two predominant means of delivering hypermedia. For organizing and displaying material, these current hypermedia use GUI (graphical user-interface) formats which are derivative. They draw from a combination of print publication equivalents, software document-creation conventions, and video presentation methods.

CD-ROMs were the first major application of hypermedia because of the vast storage capability for graphics and sound. These files are linked to create multi-dimensional games, training materials, and reference sources. Current reference CD-ROMS are organized to incrementally access graphic and text information on a single subject, but are not presently designed to enable comparison and to enhance prolonged, dynamic visual analysis.

The second major hypermedia application is the World Wide Web. Presently, the technology favors lengthy text over graphics, and graphics are commonly used as small link buttons and illustrations rather than as the core data set. While searchable GIS maps and ecommerce shopping sites are growing to be among the popular image-intensive applications on the Web, the quality of their interactivity and usefulness for visual analysis and comparison is extremely low. A complex quest is constrained by the slow speed of the Web's current infrastructure and its standard presentation methods.

For example, the Web's current accepted practice of presenting material is based on a page-to-page metaphor related to print magazines. The magazine-like vertical layout requires the scrolling of the page to accommodate the horizontal orientation of the computer screen. The page is made up of magazine-like article, illustration, and ad components. The eye roams from component to component, viewing each separately. Text is often lengthy. To obtain additional information, hypertext, symbols, drop-down menus, or query forms are clicked to call up an entirely new Web page. Often the new material is at a different Web site with a different format. The viewer attempts, with minimal success, to carry in the mind's eye the sequence of information, links, and pages. The viewer must build a mental model of the findings of their inquiry, instead of having this accomplished for them in the computer.

SUMMARY

Various embodiments provide a program-controlled interactive data processor, such as a personal computer, connected to and in communication with a server and linked to a plurality of databases and associated software. These databases, either locally or remotely located, comprise a vast amount of diverse information on select topics. The personal computer includes local programming to control the layout of information displayed on the user display. The display includes multiple, context-sensitive control panels or palettes for manipulating the information (symbols, text, drawings, photographs, etc.) presented on the user display in accordance with a selection protocol. This protocol implements a data layering process, wherein information is formatted and displayed in response to user control inputs and stored instructions, optimizing the display layout so that information is quickly presented in a form that is readily comprehended despite its complexity. Information for current assessment is presented without superfluous data elements. Relevant information is thus presented in a seamless, streamlined manner.

In at least some embodiments, the computer system includes supplemental, back-end, and user-tracking databases. The back-end database continuously or periodically gathers and stores new and changeable information so that the displayed information is always current. The user-tracking database tracks user events on the personal computer with the stored data used to return proper map data, to collect and archive data for the user, to provide data to a user's intelligent agent, and to prepare interactive map and diagram analysis reports on anonymous, aggregated user activity patterns.

The foregoing features of the described embodiments may be better understood by review of the following description of an illustrative example thereof, taken in conjunction with the drawings of which:

BRIEF DESCRIPTION OF THE FIGURES

FIGS. 3A-3C provides three examples of the basic map layout and input/output within the GUI (Graphical User Interface) in accordance with one or more embodiments;

FIG. 6D depicts components of the graphical user-interface associated with the invention, FIGS. 7A-7I depict a seamless stream of display screens in accordance with one or more embodiments.

FIGS. 12C-12F depict alternative presentations in accordance with one or more embodiments for the configuration illustrated in FIG. 12A and FIG. 12B.

FIG. 13C depicts an alternative presentation in accordance with one or more embodiments for the configuration illustrated in FIGS. 13A-13B.

DETAILED DESCRIPTION

Figure 1A:
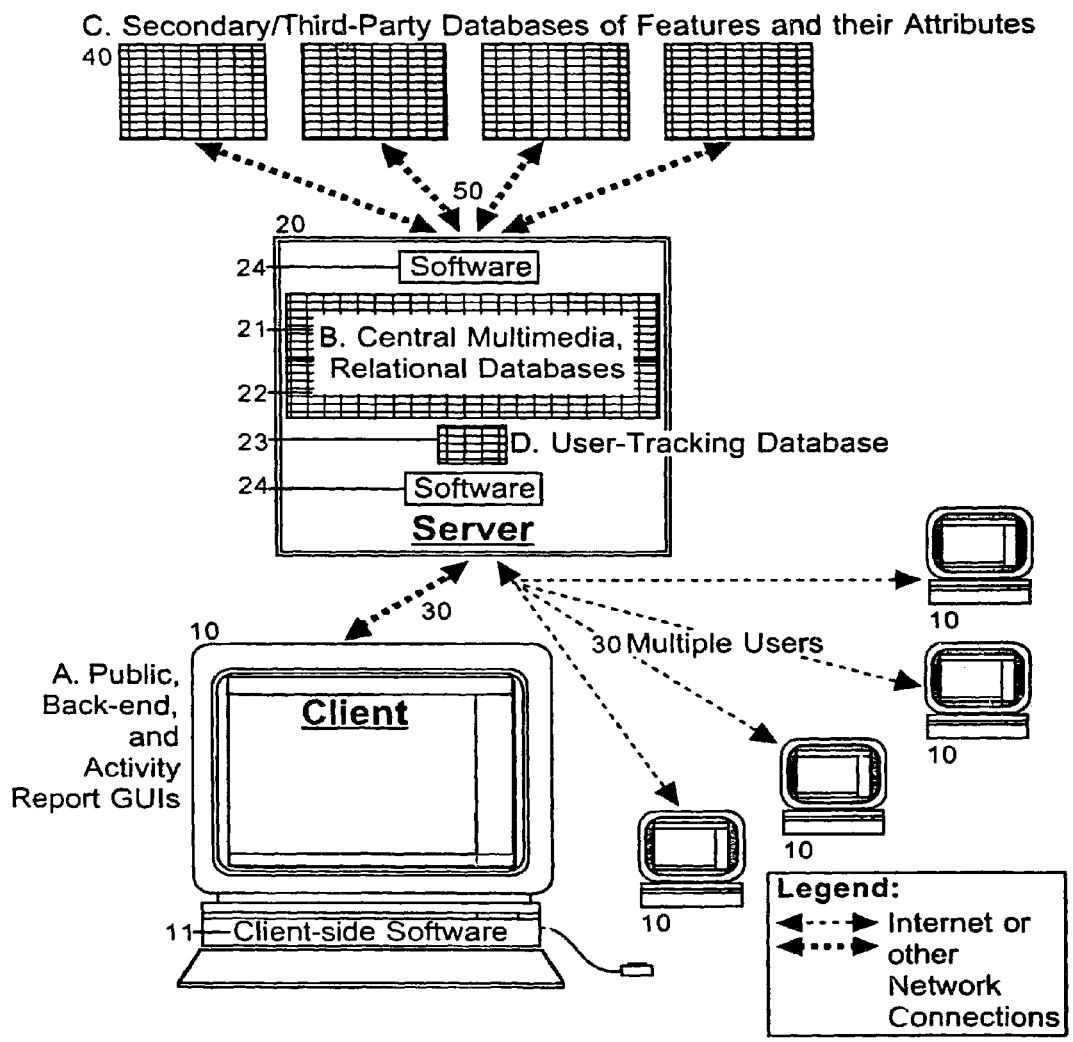
FIG. 1A provides a functional block diagram of the system environment in accordance with one or more embodiments.

First, briefly in overview, various embodiments provide a computer technology employing a next-generation computer interface, multi-media databases, and a user-tracking system to dynamically build a customized, interactive mapset. It enables content-producers to offer material as standard-formatted data that can be "picked up" by users as they browse. It enables the user to seamlessly follow a sustained, multi-faceted, analytical thought process by manipulating "map" components, layers, and annotations.

The graphic-information flow method and system uses layering and hypermedia technology to maximize the flow of information, insights, and ideas during the process of inquiry. Various embodiments provide an external aid to enhance reflective cognition ("Things That Make Us Smart," by Donald A. Norman, Addison-Wesley Publishing Company, 1993, incorporated herein by reference as if restated in full). Various embodiments provide a true browsing device for smoothly pursuing a question, for analyzing, exploring, and discovering, for comparing variations, for studying patterns and relationships, and for reaching well-informed decisions.

The graphic-information flow method and system is designed to enable continuous, focused concentration so that the computer screen becomes an extension of the mind's eye. Various embodiments enable the user to seamlessly follow a sustained, multifaceted, analytical thought process by manipulating "map" components, layers, and annotations. Just the diagram pertinent to the moment is viewed, free of distracting, irrelevant information.

Unlike expert and artificial-intelligence systems, here the human being is the intelligent expert with various embodiments serving to augment the human thought process. The users of the graphic-information flow method and system are active participants. They gain knowledge and understanding through the hands-on process of map-making. Users customize information sets by selecting layers and filling slots, then by querying to refine them. Individual analysis is further supported by providing marking tools to both stimulate and record insights.

Various embodiments combine hypermedia and layering technologies. It enables layers produced by graphics, drafting, and information systems to be organized and formatted into easy-to-use frameworks. Non-technical producers can create multi-dimensional interactive documents and reports for wide distribution. The maps can be accessed by nontechnical audiences either the general public or experts in a field of study.

The map-based, graphic-information flow method and system can be used to significantly improve the ability to study almost any complex subject. By representing a place, topic, or thing in a multi-dimensional map, previously-hard-to-recognize patterns and relationships can be discovered. These would otherwise not be apparent by attempting to view directly the place, topic, or thing or by more traditional analytical methods.

The method and system employs what is sometimes termed "cognitive art"—visual representations that aid the comprehension of complex information sets. ("The Visual Display of Quantitative Information" 1983, "Envisioning Information" 1990, and "Visual Explanations" 1997 by Edward R. Tufte, Graphics Press, Cheshire, Conn., incorporated herein by reference as if restated in full). The term "map" is most commonly associated with a flat, simplified representation of a landscape from above. A map can also be any visual portrayal of a geographic area or imaginary place including a cartographic, diagrammatic, photographic, perspective, or bird's-eye-view image or three-dimensional model. As well, a map can be a diagrammatic representation of a complex object (the human body, a vehicle, a building). A map can also graphically portray a topic for which a set of pictures or words are understood more clearly in a series of subsets and in relationship to each other (an organizational chart, a chemical sequence, or a set of scaled, color images of possible plants for the garden of different heights and flowering seasons).

In relation to the various embodiments, an addition to any such picture chart, diagram, or graph that makes it a "map" is the provision of interactive keys. These keys do more than merely define map symbols. The interactive keys enable the user to quickly switch between views showing only selected subsets of interest at the moment.

The resulting ability to instantaneously customize views of information sets supports a mapping process of:

1) setting out the significant features of a place, topic, or thing, 2) defining the features' relevant attributes, 3) seeing what attributes various features have in common and how they differ, 4) detecting how often or rarely features and attributes occur, and in what patterns, and 5) noticing the significance of their real or symbolic proximity to one another.

Understanding of the patterns and relationships often benefits from annotations viewed temporarily in association with map features. In various embodiments, text, charts, drawings, photographs, animations, sound, or video footage may be attached as annotations to map features.

The various embodiments combine a diagrammatic map with illustrative pop-ups. This dual-view design reflects the analytical mind's-eye process of switching back and forth between the overview structural image of a subject and close-up, eye-level views or "vignettes" of particular features. To aid this mental process, two perspectives can be seen at once. First, the content of the overview is pulled apart and organized into layers or matrices. Second, the descriptive feature view is shown directly in association with the feature's place on the overview.

The overview enables examination of numerous meta-representations of the whole place, topic, or thing. By switching groups of features in the layers or slots, the viewer can focus on studying patterns and relationships within particular subsets of the whole.

Individual features can be examined "up close" via pop-up annotations. For the same reasons that sidebars, summaries, and sound-bytes are useful and effective, the material in these descriptive close-ups is stripped to the essentials and consolidated into graphic representations and short text. These annotations are accessed in digestible chunks within "pop-up, flip-thru storybooks." The viewer studies an introductory pop-up card, then can click to go forward or backward in a series of flip-cards which further describe the map feature. In the storybooks, short flip-card animations are used to economically create dramatic explanation. When animation and video is used in pop-ups, it is in the form of short clips. Animation and video is used not to purely entertain. Its purpose is to clarify or explain the character and multi-dimensional aspects of a place or object, product assembly procedures, or the pattern of a movement such as a rock-climbing maneuver or a hurricane's path. Pop-up materials are concise in order to augment and enlighten, but not distract from, the study of the map overview.

The graphic-information flow system is perceived as a set of "maps"—an atlas or a catalogue. Thereby the body of information attains the feeling and credibility of a single reference object even though materials may be pulled dynamically from many sources. Various embodiments enable data from these numerous sources to be stored in a common format so that, for each user, material is gathered during the browsing process into a personalized mapset.

The various embodiments provide an online alternative to reference books such as product catalogues, yellow pages directories, travel guidebooks, entertainment listings, encyclopedias, natural history guides, text books, machine manuals, and land-use planning reports. The various embodiments can also provide an online specialty store where consumers can ask to see and compare all the available offerings for a particular item from a multitude of manufacturers and distributors. As well, the various embodiments can be used to create an image-based library for comparing similar objects such as ceramic vases, volcano eruptions, colonial churches, and butterflies.

With the graphic-information flow system, producers of information gain by being able to reach viewers more effectively than by current print and electronic methods. At this time, Internet producers put up a self-standing Web site which viewers must learn of and locate, usually via a search engine, and then must browse through to find one piece of information at a time. The various embodiments enable the creation of digital repositories with standardized formatting to aggregate data from many sources. With the graphic-information flow method and system, the value of every piece of information is increased exponentially by being easily viewable in proximity with other related information. Viewers can comparison shop for products, travel plans, and points-of-view.

Pop-up annotations augment without breaking the comparison process. Each pop-up is a sidebar-like annotation to the body of information on the main viewing area of the map; therefore viewers are more likely to take a few moments to explore the descriptive material without fear of getting lost. The map remains the orientating device to come back to. Viewers feel in control and can digest the descriptive material at their own pace. Pop-ups about geographic sites have added power because they are seen and remembered in association with the site's location. Pop-ups can serve as an effective and useful advertising mechanism sought after by prospective consumers. Unlike Web banner ads, viewers are actually asking to see the ads or "info-tizements" because they are associated with the topics the viewers are researching.

With the annotation and publishing tools, users of the graphic-information flow method and system can define new features and attributes to contribute to a mapset and can post new layers and mapsets online to share with others. The graphic-information flow method and system is intended to take publishing beyond the single-source, broadcast model to the many-to-many model. At the same time it is intended to provide the ability for respected experts and information-integrators to create tangible, credible, "branded" hubs that take responsibility for the quality of the content they make available.

The graphic-information flow method and system for visually analyzing patterns and relationships is a computerized reference map system for assembling and integrating a set of materials about a place, topic, or thing in order to enhance the flow of information during the process of searching for knowledge and insight. A database-derived "map" displays representations of a place or a set of objects to be compared. This single, compact computer user-interface with layered indexes, keys, and content enables discrete sets of material from a dispersed network of large, multimedia databases to be accessed smoothly and repeatedly.

The method and system software uses layered and slotted maps with clickable map keys. The viewer manipulates "map" components, content layers, and annotations by clicking symbols. Clicking symbols on map keys and query boxes shows and hides graphic features with requested attributes. The features are organized in map layers and slots. Clicking map features shows and hides text messages and pop-up annotations about the features. The viewer thereby easily studies features in context with other relevant graphic information. The various embodiments provide for smoothly calling forth a set of graphic data to inform and stimulate a sustained, multi-faceted, analytical thought process.

The software may be deployed as a stand alone application and on enterprise, intranet, and interne networks. It may be used in traditional personal computers and in future computer systems employing screens that may be flat, wireless, and/or pressable or pen-responsive, that may be larger or smaller than current PC screens, and that may be as portable, thin, foldable or rollable as a paper map or chart (see FIG. 1B).

The graphic-information flow method and system for visually analyzing patterns and relationships is realized through computer software. The various embodiments can include template computer software for publishing a set of materials in a format that the user can smoothly browse. The software calls from a multimedia database to display a graphical user-interface (GUI) and alter it in response to user commands. The GUI has a central layered or slotted map area surrounded by control panels.

The software employs "smart" graphics as symbols on maps and control panels. The graphics are "smart" in that they can be programmed to respond to user commands, calling to a database to cause an action. Users click control panel keys and query boxes to fill map layers and slots. Users point at and click "smart" graphics on the maps to call forth annotational text, images, sound, and video. Users at the back-end and front-end create, drag, reshape, reprogram, and otherwise change "smart" graphics with editing tools.

The graphic-information flow system software template consists of GUIs (graphical user-interfaces), multimedia databases, and the software for configuring and operating the maps. The GUI is designed to permit operation on a variety of existing and future hardware devices; and the software can be developed using commonly available software languages, database programs, and electronic information systems.

Software on the server and client performs a number of functions. The template software enables customization of the database features, attributes, symbols, annotations, and topic organization; of the GUI layout; and of the animation and query configurations. GUI and database tools are provided for initial mapset creation and subsequent editing by authorized editors, dynamic databases, and public users. Software components include map and database interfacing; dynamic generation of graphics, imagemaps, and code; and user-tracking and activity-reporting. Directory and query box formatting automatically turns text lists into formatted top-layer graphics with retrieval bars and key extenders as necessary. The software uses "smart" graphics to provide for interactive keys and map features, map graphics layering and slotting, querying, and notation and publishing tools. The software also accommodates signaling from input/output devices such as GPS and adaptation to future input, output, and selector devices.

Special control apparatus are used extensively throughout the system's graphical user-interfaces to retrieve layered indexes, keys, and map content. These special control apparatus enhance the ease of browsing while accommodating the size and resolution limitations of the computer screen. These preferred special control apparatus are designed to improve operation, but are not required and do not preclude use of other special control apparatus.

Five special control apparatus augment the index, key, and map configurations. First, message boxes within the map area show updateable text data. The message is typically: 1) the name and other tabular data for a feature in response to the cursor pointing to the feature, or 2) data for a set of features which is updated dynamically as time-sensitive information is changed in the database. Small message boxes also may appear as pop-up feature labels atop the map. Message boxes may be used for the viewer to type text input. Second, retrieval bars are used for switching information in indexes, keys, message boxes, and pop-ups. Retrieval bars use graphical or alphabetical segments that provide an improved alternative to traditional scroll bars. Third, key extenders revise control panel and message box content via overlays and pop-ups. Key extenders provide means for selecting additional feature attributes and for switching topics and sets of keys or message box contents. Keys are extended by clicking on topic titles or arrows. Fourth, query boxes, that may be in the form of key extenders or map area pop-ups, provide means for selecting multiple attributes for a complex query. A query is requested by clicking a button; and the results are returned by updating the map area. Fifth are user editing and publishing tools along with interactive how-to guides and tutorials that take new users through notation and publishing procedures.

Having the foregoing objects and functionality in mind, attention is now directed to a specific implementation. Referring now to FIG. 1A, the inventive system is first presented in functional block diagram form. Specifically, the system includes one or more workstations or other personal computer devices 10 with both local programming 11 and communication 30 to a remote server 20. This server includes additional programming 24 to assist operation and a central multimedia, relational database 21 and 22 containing a number of support databases stored in high capacity memory.

Figure 1B:
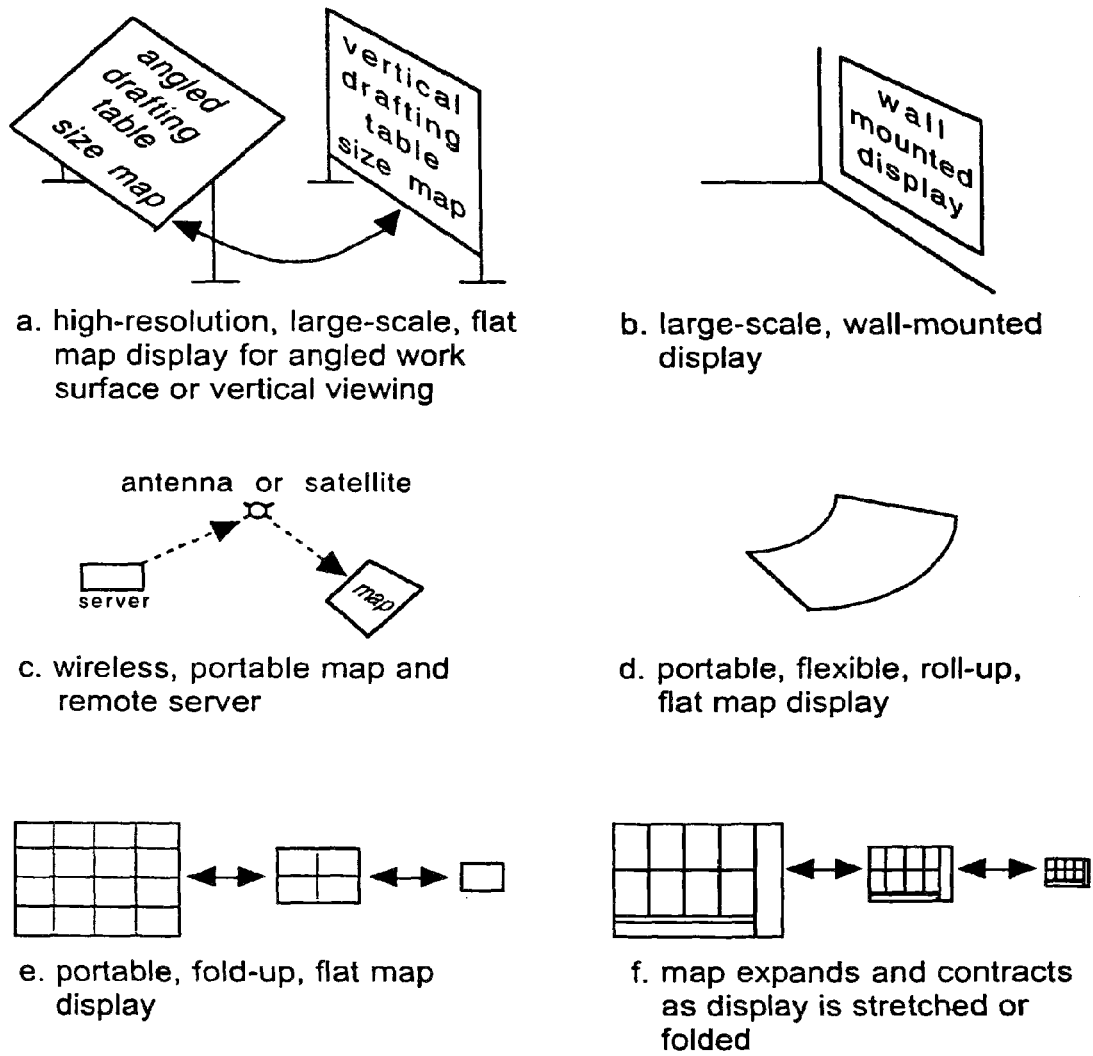
FIG. 1B provides examples of alternative personal computer devices to display various embodiments described herein.

Exemplar memory modules include Base memory 21 and Topical memory, 22. In this context, select mapping elements commonly known as Base elements will be stored in the Base memory module and the Topical elements in the Topical memory module. As database entries, these elements are available for high speed delivery to each of the personal computer devices, either sequentially or concurrently, via the network link 30. A user-tracking memory module 23 stores data about each user's activity. To enhance this dynamic capability, the system includes an expanded link to the Internet or other network connections 50 so that the vast array of Internet or network source materials may be accessed and combined with the base and topical data of the central database and thus become available as information for mapping onto the selective two dimensional display. In addition to the role as a source for database information, the Internet and other network connections permits remote process control of the database content, including access and editing functionality via the personal computer devices 10. FIG. 1B shows alternative personal computer devices such as (a) high-resolution, large-scale, flat map display, (b) large-scale, wall-mounted display, (c) wireless, portable map and remote server, (d) portable, flexible, roll-up, flat map display, (e) portable, fold-up, flat map display, and (f) map expands and contracts as display is stretched or folded.

Figure 2A:
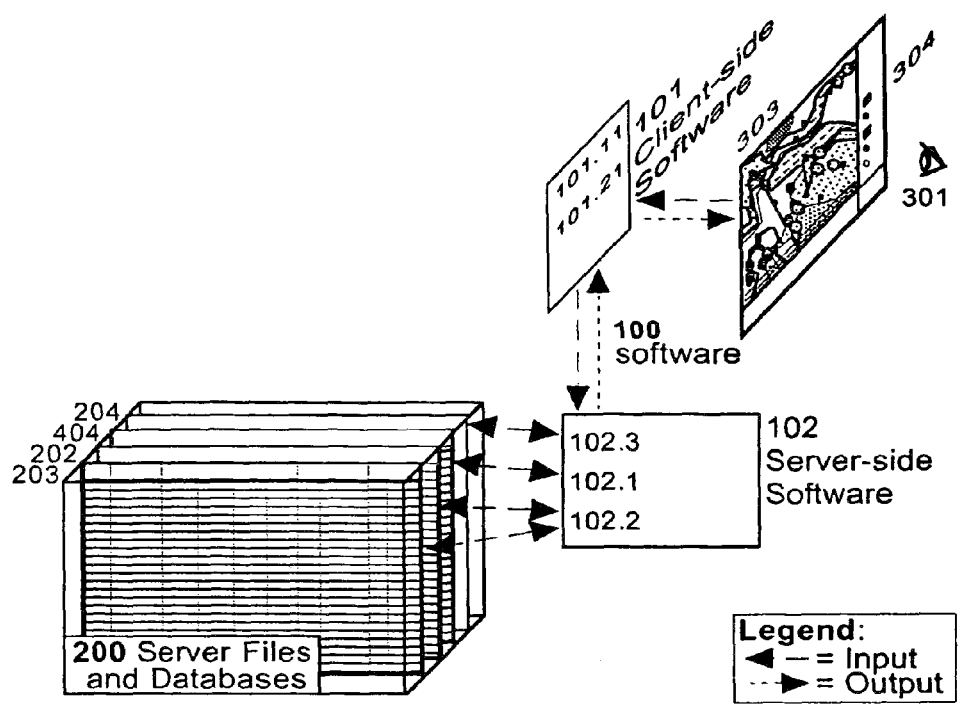
FIG. 2A provides an exploded presentation of the primary command and data flow between the client and the server.
Figure 2B:
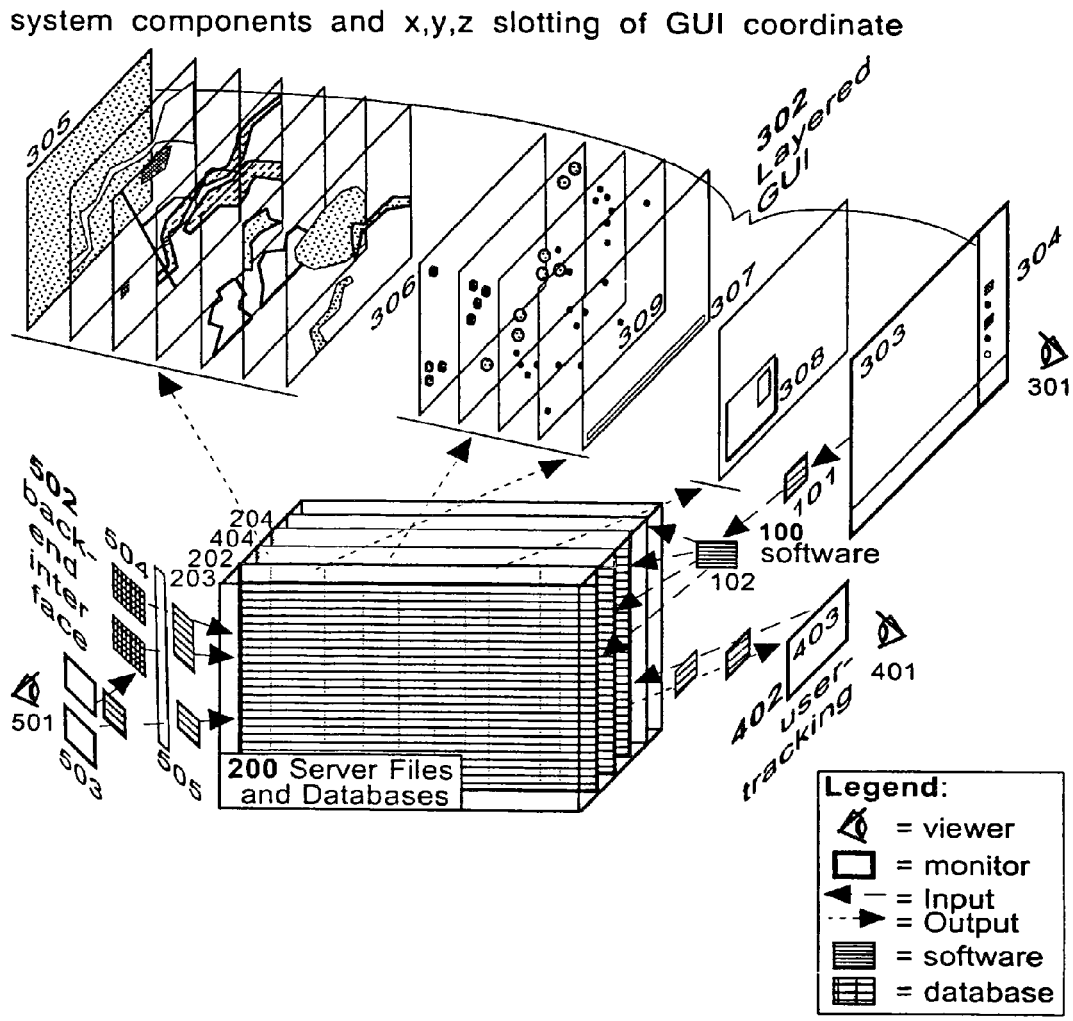
FIG. 2B provides an exploded presentation of the system components with an x, y, z coordinate slotting of the GUI (Graphical User Interface) in accordance with one or more embodiments.
Figure 2C:
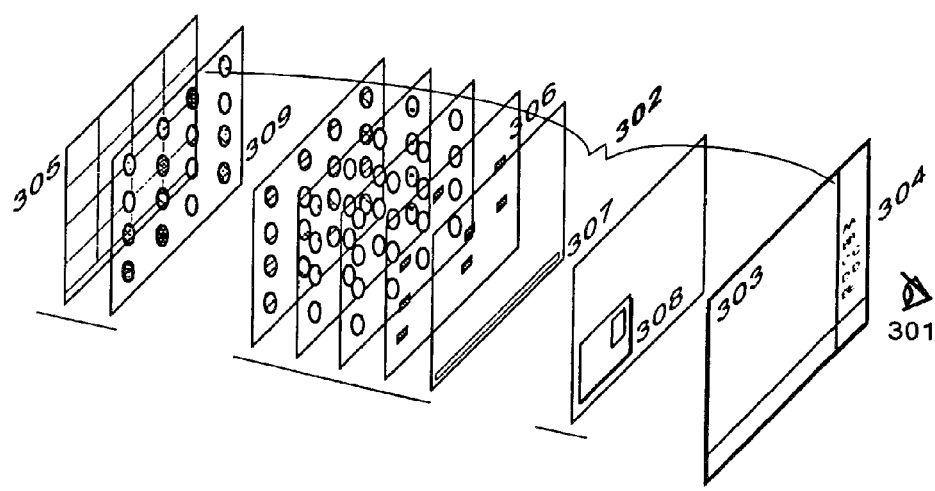
FIG. 2C provides an exploded presentation of the gridded slotting of the GUI associated with image processing in accordance with one or more embodiments.

Turning now to FIGS. 2A-2C, the system components are depicted in exploded view format. In these diagrams, arrows are used to indicate command and data flows. FIG. 2A depicts the primary command and data flow between the client and the server. To permit the seamless custom data flow to the presentation, the system display includes a map area 303 for imaging the map elements as recalled from the server 200. To control data selection and access, an interactive control panel with map keys 304 is displayed on a portion of screen real estate, with selections thereon governing the map area. When the User 301 causes a user-event such as a mouse click to the map or control panel, a sequence of software commands occurs reflected by the arrow to the Client-side Software 101. A browser program 101.1 parses the request and runs the client agent software 101.2 which may consist of HTML, Javascript, CGI, Java, ActiveX and/or other code. The client agent software processes the request and alters the map area image reflected by the arrow back to the display. If a complex query, additional graphic files, or updated information is required, the client agent sends a request to the server software 102 and multimedia relational database 200 that may reside on the client or across a network on another computer. This request triggers a sequence of events which gathers and assembles the graphic material on the server and sends it back to the client for display.

In at least some embodiments, and as is discussed in detail in FIGS. 2B and 2C, elements comprising separate layers are stored in addressable databases, including central server files and databases 200 (comprising base 202 and topical 203 data sets, graphics files 204, and user-tracking database 404) wherein the grid depiction reflects data fields for each cell. The server software first uses a daemon 102.1 to report to the user-tracking system 404 in order to record the event and to retrieve relevant information about the history and state of user's map and any files on user preferences or from a user's intelligent agent. The server software then calls a database access daemon 102.2 to query attributes and to look up in the databases 202, 203 such information as feature name, symbol, x,y location, z-layer, and annotation display data. The server then uses the results to determine which graphic files 204 to retrieve, how to plot and layer them, and how to reconfigure the interactivity of the graphics such as imagemaps (the areas of the map which respond to user events). The resulting GIF and imagemap coordinates and scripts are sent back to the client for display.

FIG. 2B represents the various system components. At the top, the two-dimensional information content of the display provided to the User 301 is depicted in exploded view as layers forming display content with the context of a geographic setting comprising elements such as rivers, streets, parks, etc. As can be seen, the layers are each characterized with select information that is of varying importance to the User. The base map elements are pulled from the base database 202 when the user first calls up the mapset. The User interactively turns additional layers of map data on and off to provide a more complete but concise data presentation via interactive control panel entries as described above in FIG. 2A. The topical database 203 provides content and display information for "smart graphics" 309 on topical layers 306, text in the message box 307, and pop-up annotations 308. The interactive "smart graphics" 309 on the control panels, base, topical, and pop-up layers are associated with user-triggered scripts and data in the databases which govern changes in the control panel and map area display in response to particular user input. Additional data is retrieved dynamically from secondary and third-party databases 504 at the back-end 502 of the system, passing through a security device 505. Content providers and editors 501 can alter content via back-end interactive map interfaces 503 that send graphics files and data to back-end databases and through security to the central server 200. The user-tracking system 402 enables aggregated user-activity patterns collected in the user-tracking database 404 to be viewed on a map interface 403 by system operators 401.

FIG. 2C depicts in exploded view a slotted-format display configuration in which base data is positioned in designated sub-areas of the map rather than via x,y coordinates as in FIG. 2B. This type of slotted-format can be used for any chart layout. In the illustration, a gridded base map 305 provides the containers for a set of "smart graphic" objects 309 to be compared. Upon calling up the mapset, the viewer 301 may use the control panels 304 to query the database for a selection of objects that meet certain criteria. Once these are displayed in the map area 303, common features of the objects may be selected via the control panel key for layering or hiliting 306. By pointing the cursor at a selected object or feature, the viewer requests text data to be retrieved from the database and displayed in the message box 307. By clicking on an object or feature, the viewer requests a pop-up annotation 306 about the object.

Figure 2D:
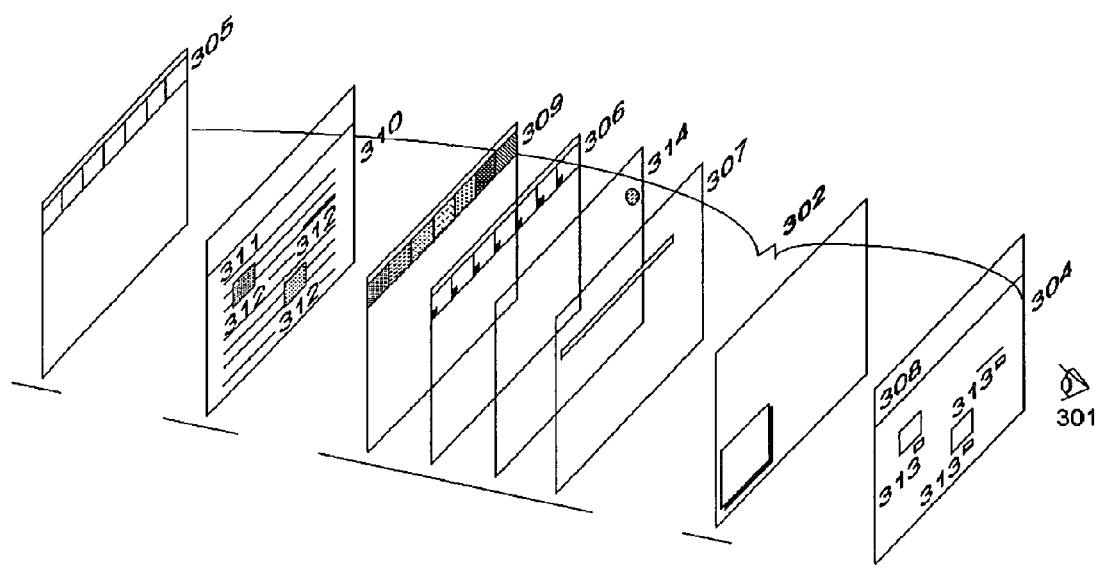
FIG. 2D provides an exploded presentation of an alternative configuration of the components of the GUI in which special control apparatus are inserted within a document to serve as the means of access to data for the user to collect and view in the slots and layers of a map.

FIG. 2D depicts a slotted- and layered- format display configuration 302 in an exploded view in which selected elements are collected in the map area 303 of the viewable area and the control panel 304 includes base data made visible in one or more computer documents. The map's base presentation 305 and layout of layered map slots 309 may be a slotted grid, as shown in FIG. 2D and in FIG. 2C, or it may be a layered map as shown in FIG. 2B, or in another chart or graphic layout. The map may be positioned anywhere within the viewable area and may be hidden and shown as desired. In FIG. 2D, the control panel area 310 includes one or more documents 311 that provide the base information from which "smart graphic" objects 312 (images or text with an ID and data attached) can be collected to be compared or otherwise analyzed and to enable access, at a later date, of subset elements represented in the map by images, words, characters, and the like.

A user 301 uses special control apparatus 313 to signal (for instance by clicking or dragging or other suitable indication means) that a visual representation of a portion of the control panel document should appear or be collected in the map slots 309 or subsequently removed from the map or altered within the map. These visual representations may be words, symbols, or images or a combination of words, symbols, images, and the like. Once these representations are displayed in the map, additional control apparatus 306 within the map area 303 may be used to remove or reshow their display, change their appearance or associated data, alter the look and/or content of the control panel document 311, and alter the look of "smart graphic" objects 312 and special control apparatus 313 in the map and control panel 304. By pointing the cursor at a "smart graphic" object 312 in the map or control panel document, a user 301 requests text or graphic data to be retrieved from the database and displayed in the message box 307. By clicking on a "smart graphic" word set, symbol, or image 312 in the map or in the document, the user requests a pop-up annotation 308 about that which is represented by the word set, symbol, image. Alternatively, clicking on a word set, symbol, or image in the map can call forth, in the control panel area 310, enlargements, information, text, and visual descriptions represented by the word set, symbol, or image. A special control apparatus such as a button 314 or the like may be used to show, in the control panel area 310, graphics and/or text for all or a portion of the set of images and words that have been collected in the map. Once collected, the object may be manipulated or removed, and the original document may be redisplayed.

As shown in FIG. 2D, such an application of the present invention provides a system for the collection of word sets, symbols, images, or other representations while undertaking research through many documents, reading a lengthy or complex document, or viewing another slotted and layered map. The collected word sets, symbols, or images remind the reader of previously viewed content. These representations may be rearranged and have their look changed within the map to categorize, compare, study patterns and relationships, or otherwise analyze data or make decisions about the data represented by the collected word sets, symbols, or images. A word set, symbol, or image in the map may be clicked or otherwise manipulated by the user or by additional software to have data related to it shown in the control panel area. Special control apparatus can be used to display data related to all the collected word sets, symbols, or images, or subsets of the collected word sets, symbols, or images in the control panel area. Thereby, the document serves as a key, the user-controlled means of access to computer data that may be collected in map slots and layers.

The graphic information flow system can display images representing any place, topic, or thing. Three types of map layout within GUIs (Graphical User Interfaces) are shown in FIGS. 3A-3C. The layered map of FIG. 3A is used for sets of features with relative spatial locations that can be positioned by x, y coordinates. The slotted map of FIG 3B has sets of discrete features positioned in a grid for comparison, 3*b* or in a chart with slots placed to represent features' relationships, in FIG. 3C . Each layout starts with a base map and a control panel, 601. The user clicks the key to select one topic for display, 602. Also illustrated in 602, the user may point at a feature on the map to view text data in the message box. To compare features, the user selects from the key another topic or attribute subset for display and comparison, 603; this may be repeated to show and compare other topics; clicking the key topic a second time deletes that feature from the display. In 604, the user clicks on a map feature to view a pop-up annotation. The interactive pop-up appears in an area away from, but near the feature which is now hilited.

Figure 4:
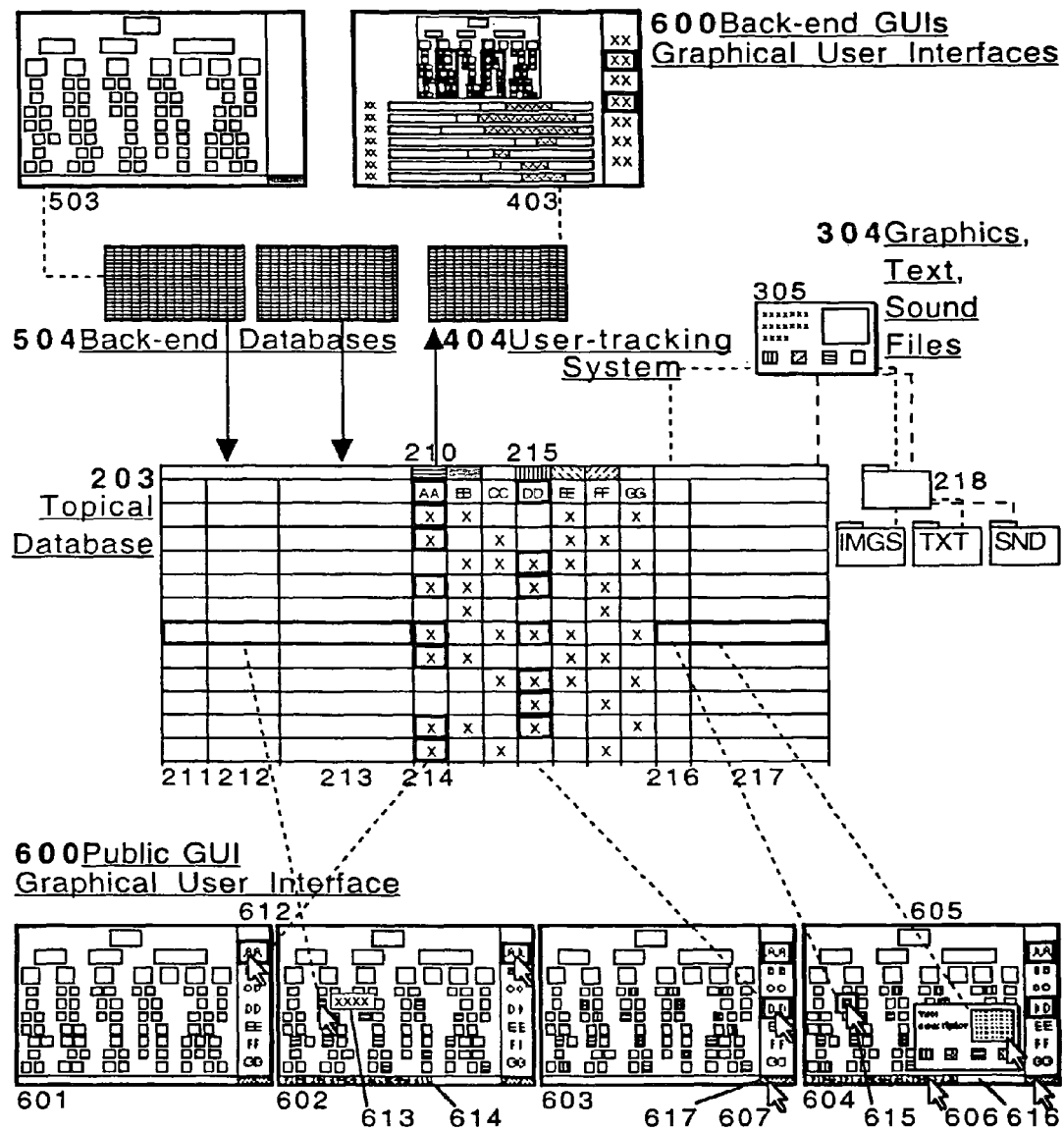
FIG. 4 provides a GUI/database operations diagram in accordance with one or more embodiments.

FIG. 4 shows the basic GUI/database operations that the database calls as a result of the GUI Input/Output sequences of FIGS. 3A-3C. The Topical Database, 203 at the center of the drawing stores a set of feature and attribute data and is updated dynamically from the back-end interfaces, 503 and back-end databases, 504 at the top left of the drawing. As Users interact with the system, activity data is recorded and stored in user-tracking system, 404 and available for User activity reports, 403.

At the bottom of the drawing, a series of GUIs as seen above in FIG. 3C are shown. The broken lines indicate command sequences from the GUI to access the data via key "mouse" selection from the Topical Database, 203. In operation 601, the User "click" to topic "AA" on the control panel key, 612 alters the map display, 611 and displays that topic. Specifically, the system retrieves the source data from the topical database, 203 and determines the symbol, pattern, and color for "AA" attribute, 210. Thereafter, the system provides the slots or layers corresponding to the "AA" attribute, as indicated by the "X"s in the column headed by the "AA" designation, 214. All corresponding data items with the "AA" attribute, 214 are then placed on the Map area, 611.

In operation 602 of FIG. 4, the user points to one feature on the map to view text data about the feature. The software determines the slot or coordinate of the cursor and finds the slot designation or x, y coordinate in column 211 of the database, 203. The software retrieves the name from column 212 and text description of the feature from column 213. It displays this text data in the message box, 614 and/or the name in the label, 613, positioning the label near the feature.

In operation 603 of FIG. 4, another feature, "DD", is selected and this is used to find corresponding entries from the topical database, 203, as indicated by the "X"s in the column under the "DD" attribute. These features are then presented on the screen, available for User review.

In operation 604, a click on a feature, 615, causes the display of an interactive pop-up annotation, 616. When the pop-up appears, the feature on the map that was clicked is hilited to retain the connection between the annotation and the feature. The configuration of the pop-up, 305 is determined by the data in columns 216 and 217, informing the software as to which graphics, text, and sound to retrieve from the file, 218. The pop-up itself may be interactive with mouse clicks triggering animations, 605, or causing new pop-up cards to be displayed, 606.

In order to call forth another mapset, the user clicks an index or a context map or diagram, 607. The context control, 617 shows the present location of the current map in the mapset. Clicking its hilited areas calls up the master directory or switches to other maps. The other maps may be another representation of the same data or a related information set.

Figure 5A:
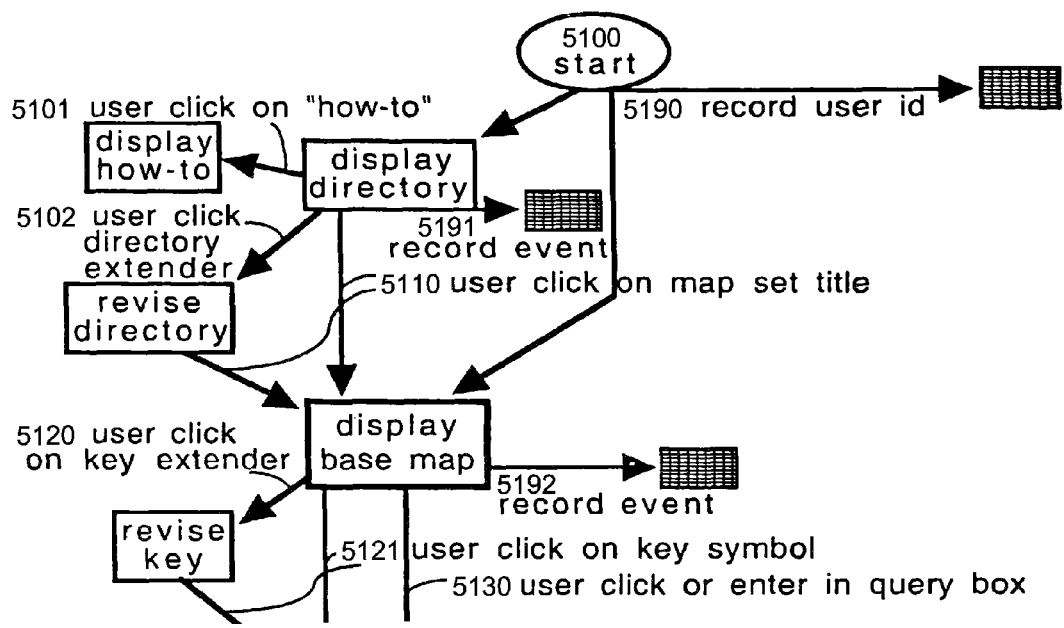
FIGS. 5A-5B are partial views that provide a logic flow diagram for the present invention.
Figure 5B:
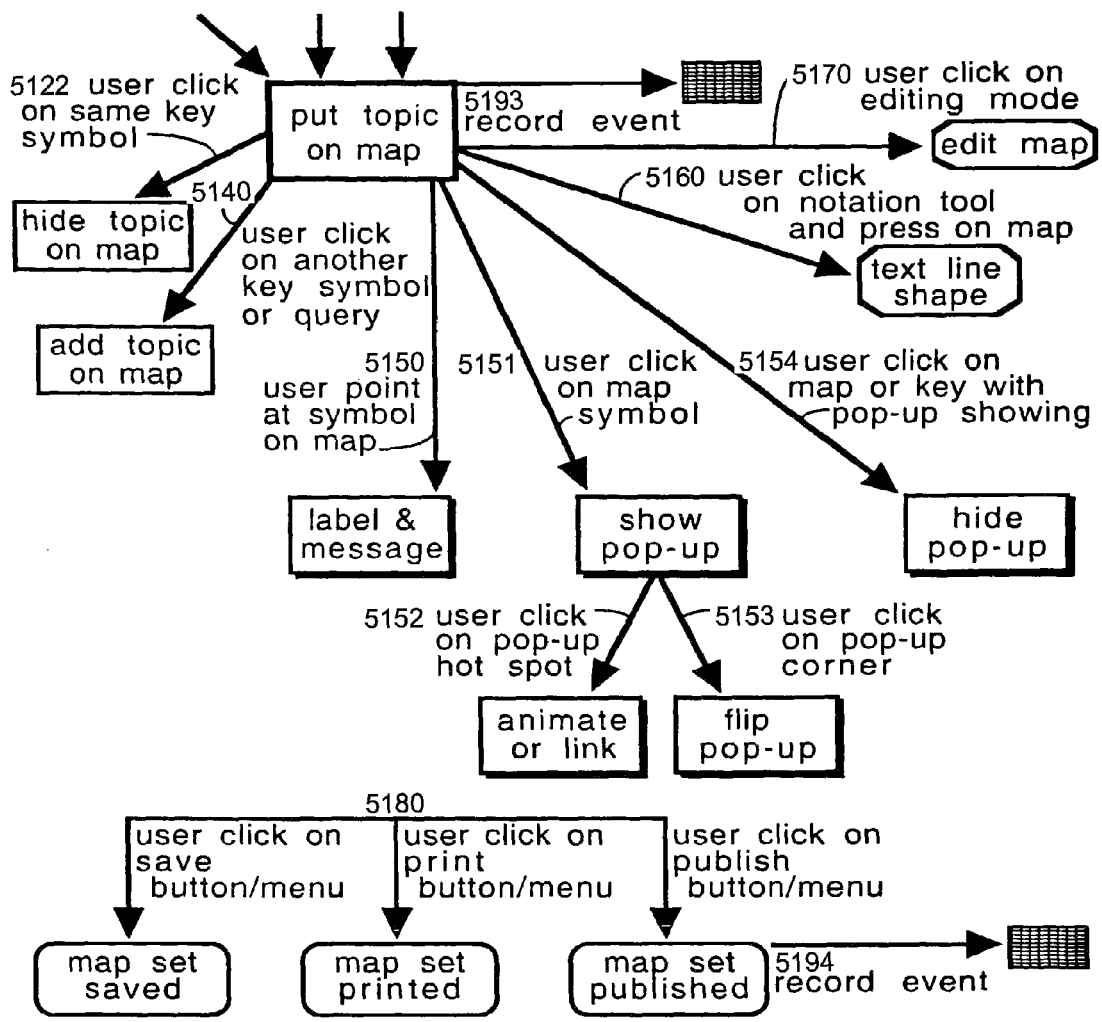
Figure 5C:
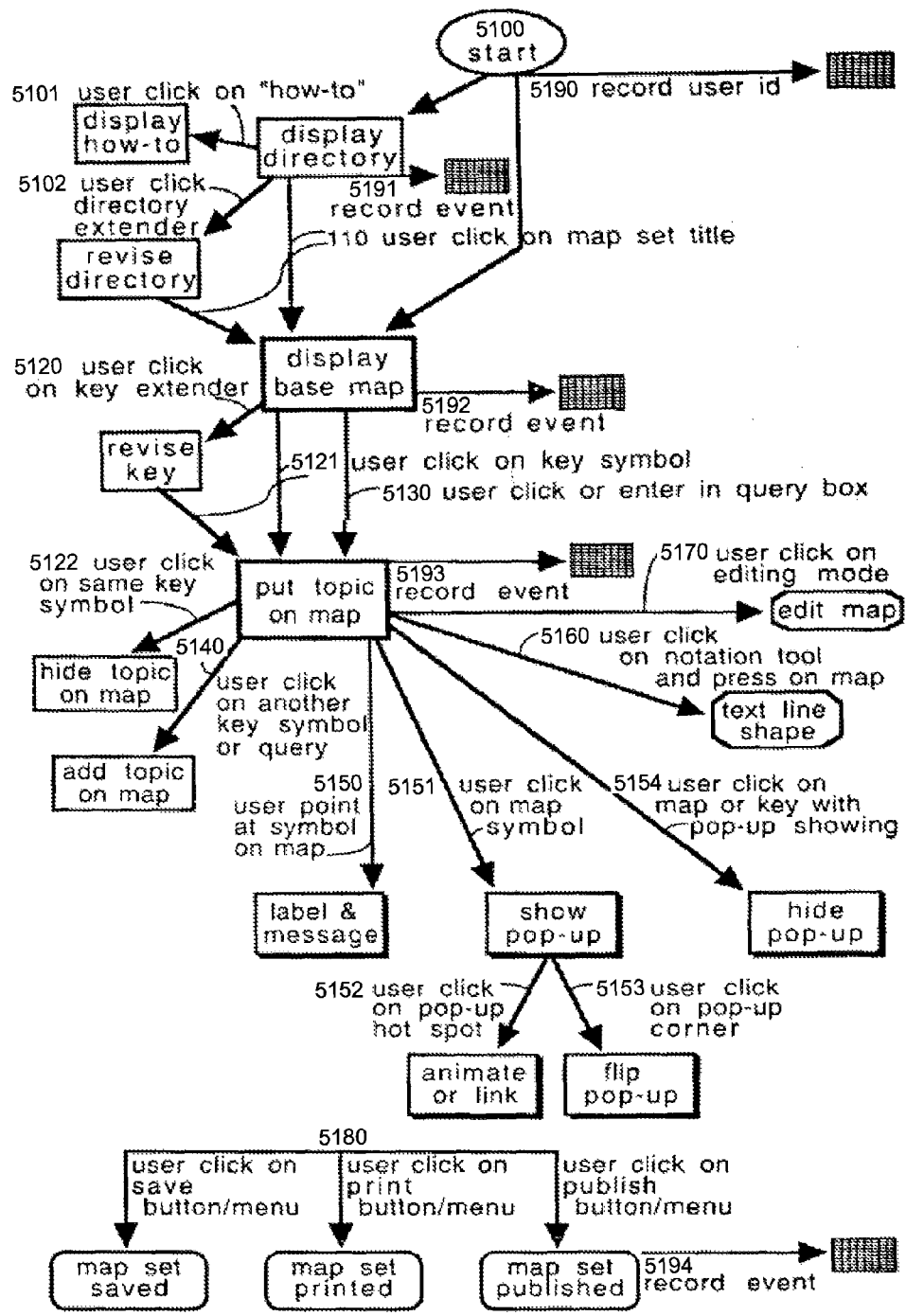
FIG. 5C is a small scale view of linked partial views 5A and 5B.

The initialization of the program, navigation to the desired mapset, and manipulation of the interactive map are depicted generally in the flowchart of FIG. 5A and 5B and begins with the start up, 100 when the User clicks on the program icon to enter the system. The resulting actions include the recording of a User ID in the user-tracking system, 190 and the system calling up the program from a CPU, CD-ROM, network or internet server. The start-up screen is displayed with a base map or a directory of available mapsets. A directory may have a text or graphic table of contents or index; or it may be a single graphic representation of the contents such as a world map or other overview image, or a combination of the two. The how-to event, 5101 is optional and may be accessed at any point. It involves the User clicking on a "how-to" button. The program calls up a screen or animated overlay with information about how to use the program. This is preferably a short animated sequence on top of a view of the directory (if applicable) or on top of a view of a base map. In the directory or base map key, Users may be given a choice of written languages which is noted as a variable and referenced whenever words are displayed.

If the software includes a directory, the User may click, 5102 on a directory extender control apparatus. The directory will then be revised. The program will call up additional subdirectory text or zoom in on a world map or overview image. This process is repeated until the desired mapset is identified by title or image. The selection of the desired mapset is accomplished via event, 5110 in which the User clicks on a mapset title or image. The program displays a base map for a mapset of a place, topic, or thing. The selected mapset is recorded in the user-tracking system, 5190 and subsequent user-events are also recorded, 5191-5194.

Once the base map is displayed, the User will use the control panel key to select the first topic set for display on the base map. The User may first need to click on the key extender, 5120 to revise the key in order to view the desired feature-set. The User clicks on a key symbol, 5121, and the feature-set is displayed on the map. To accomplish this, the program searches in the database and recognizes the feature-set (layer) associated with the x,y coordinate of the mouse click (see FIG. 4, Operation 601). The program finds the column in the topical database for the requested feature-set. If part of the database is designated for symbols or a symbol is associated with the topic column, the program notes the symbol designated to represent the topic and finds rows with that column checked (see FIG. 4, 210). If part of the database is designated for images or "image" is associated with the topic column, the program notes which rows have an image. For each checked row, the program retrieves the symbol or image from the graphics file or cached images on the client and displays it at the designated x, y coordinate or in the designated slot, replacing the graphic of the base map.

If the symbol is not a rectangle, the program determines its shape. The shape may be a set of points for a line or polygon or a bitmap graphic with a mask. The program alters the map only for the area within the symbol. If the symbol (typically a shape or polygonal area) is designated as transparent, the program calculates the alteration of the underlying map colors within the area. For gridded slots each showing images of similar objects for comparison, the appropriate feature of the object is hilited. For layers or slots, a hilite may be an outline or filled shape; it may be opaque or a transparent tone altering the color of the underlying image.

If the User clicks on the same key symbol, 5122, the feature-set is deleted on the map. The program repeats the actions of 5121, but deletes the symbol or images by displaying the appropriate portion of the base map image (stored in the user-tracking database) in its place. If the User clicks on a symbol or label in a query box or enters text in a query box, 5130, the feature-set is displayed on the map by another means, as follows. The program repeats the actions of 5121, but searches for multiple columns to be checked or searches for text matches in a column. It displays a symbol, image, or hilite at the designated x, y coordinates or in the designated slot, replacing the graphic of the base map.

The User then will click another key symbol or query, 5140 adding a new feature-set to the map. The program repeats the actions of 5121, but does so in comparison with other symbols, images, or hilites currently displayed (see FIG. 4, Operation 603). If two symbols have the same coordinates or overlap, the program uses an algorithm to adjust the placement of the symbols so that all or part of both are visible, and determines which should be displayed on top of the other. If the topics use patterns, colors, or hilites as symbols, the program determines a third, combined pattern color, or hilite to signify its representation of two attributes or for the overlap. For an "and" query, the program will hide previously visible symbols for features that do not have all the attributes. This action may be repeated to add other symbols; and keys for visible features may be clicked to hide their symbols.

Two means of viewing annotational material about map features are possible. First, if the User points with the cursor (mouseOver) at a feature (symbol) on the map, 150, a message and label may be displayed (see FIG. 4, Operation 602). The program searches in the database and recognizes the feature associated with the x,y coordinate of the mouse location. If there is a message box on the map, the program displays text from the database in the message box of the map. If labeling is being used, the program reads the name for the feature from the name field. It calculates the size of the label based on the number of characters and the width of the font being used to size the label. It displays a label with the name next to the map symbol or in the slot, the label may have a line that connects the symbol to the label set at a distance to allow viewing of the area surrounding the symbol. A default location in relationship to the map symbol or slot determines its positioning. If the label would go outside of the map area or is too long for the slot, the program shifts it to an acceptable position. When the User moves the cursor away from the symbol (mouseOut) or clicks the symbol, the label is hidden, but the message box information may remain.

Second, if the User clicks on a map symbol, 5151, the program displays a hilite around the map symbol and a pop-up is displayed. The program searches in the database and recognizes the feature associated with the x, y coordinate of the mouse click (see FIG. 4, 604). If the row has pop-up annotations, the map symbol is hilited and the first pop-up card is assembled as described in the database (see FIG. 4, 305). The program calculates the quadrant or portion of the map within which the x, y coordinates of the map symbol are located. It then determines another appropriate quadrant or portion of the map over which the program will display the pop-up. It then replaces that quadrant or portion with an image that combines the shadowed pop-up edged by the visible map graphic surrounding the pop-up.

The pop-up itself may be interactive. If the User clicks on a pop-up hot spot (a button, object, icon, or imagemap), 5152, the pop-up is altered (see FIG. 4, 605). The pop-up displays additional information including links to other graphic and text data, animations, and sounds based on information in the database (see FIG. 4, 216, 217). If the User clicks on a pop-up corner, 5153, the pop-up changes to a new card. The program retrieves the next or previous pop-up card based on information in the database (see FIG. 4, 606). For written languages that read from left to right, clicking on the right corner calls the next pop-up card, and clicking on the left corner displays the previous card. This may be reversed for languages that read from right to left. Forward and back arrow symbols may be placed on the corners.

If the User clicks on a symbol or map while the pop-up is showing, 5154, the pop-up is hidden. The hilite of the map symbol is deleted and the original map replaces the pop-up in the quadrant or portion of the map. Clicking a key symbol also hides the pop-up before altering the map display. The program may be set up so that clicking on another visible map symbol will simply replace the contents of the pop-up and reposition it if appropriate.

If the User clicks on a notation tool for text, lines, or shapes in the control panel, 5160 optional, the cursor changes to the I-beam (for text) or a cross (for a line or a shape). The User presses on the map and types or drags. Upon release, text, line, or shape notations are made on top of the map and recorded in the user-tracking system. The notation layer symbol is hilited on the key (additional notation layers may be provided). When the User clicks on a key symbol for the notation layer, the notations are hidden or shown.

User-editing, 5170, is optional for public users; this is the process whereby authorized Editors add information via a password-protected back-end interface (see FIG. 4, 503). When an Editor or User clicks on a symbol tool in the control panel or in an edit or tools menu, a new symbol is created. A copy of the selected symbol is positioned on an appropriate place on the control panel or map. The new symbol is hidden and shown several times to call attention to it. When the Editor/User presses on the new symbol and drags to a position on the map, the symbol is moved. The symbol is repeatedly repositioned to the x,y coordinate of the cursor. If the cursor moves beyond the map boundaries, the symbol stays at the edge of the map. When the Editor/User releases, a row is added to a database with the symbol, an ID number, and its x, y coordinates.

Authorized Editors' changes are entered in the base map or topical databases, as appropriate. For public users, the row is added to the user-tracking system database within a user-added layer associated with the User ID. A data entry dialog box appears in which the Editor enters name, message information, and pop-up data; this is optional for public users. When the Editor/User enters a name and other data and clicks "OK", the data entry dialog box disappears. The name and data are entered into the database row of the new symbol and then are called up when the User clicks a new symbol, 5150, 5151, 5152. If the Editor/User does not press a new symbol or clicks "cancel" in the data entry dialog box, an alert message appears asking the User if they want to delete the symbol. If the User clicks "yes" or "cancel", the alert dialog box disappears and the new symbol is deleted. If "no", the data entry dialog box reappears. If the Editor/User clicks the delete-symbol tool and clicks on a user-added map symbol, a symbol is deleted from the map and the row is deleted from the database. An "Are you sure?" dialog may appear before doing so and the User may thereby cancel the deletion.

Editing may also be done via a database interface. If the Editor/User clicks on "view database" in the control panel or in the edit or tools menu, the appropriate portion of the database appears in the map area. Any fields that may not be edited are grayed. The Editor/User may add rows and enter text in the database. The Editor/User may toggle between the database interface and the revised map to view and modify changes.

Users may save, print, and publish their mapsets, 5180. When the User clicks on the "save" button or menu, the mapset is saved. When the User clicks on the "print" button or menu, the mapset is printed. When the User clicks on the "publish" button or menu, the mapset is published online.

EXAMPLES

Figure 6A:
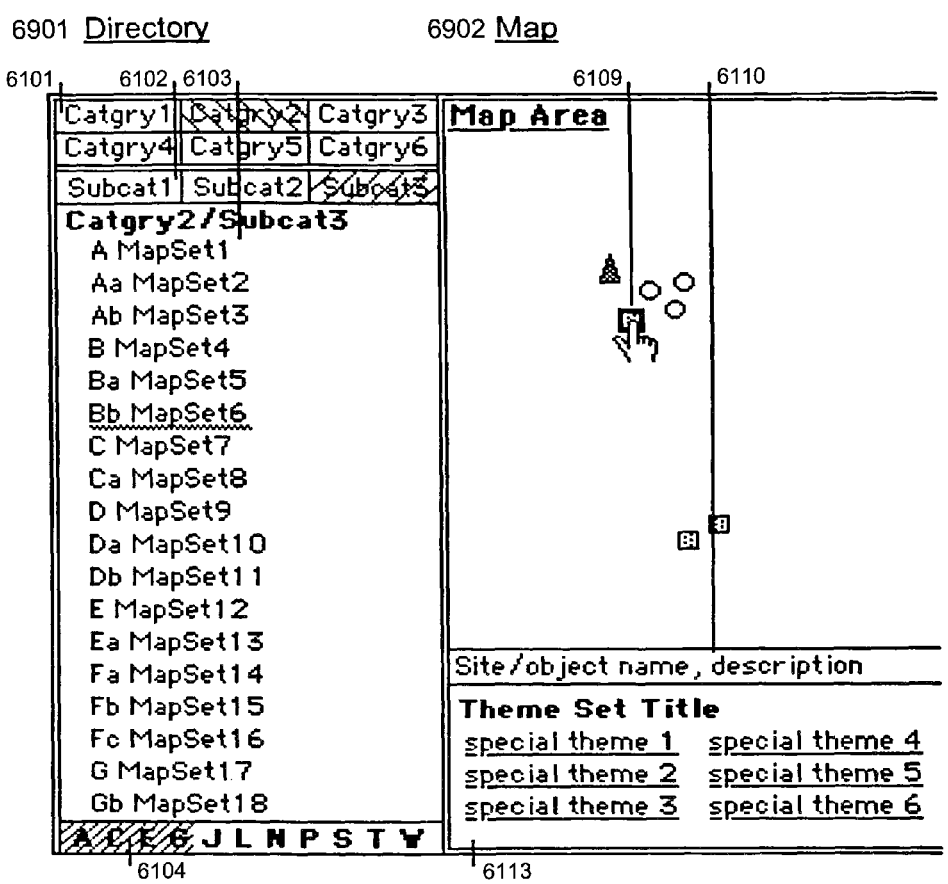
FIGS. 6A-6B are partial views that depict components of the graphical user-interface associated with the present invention.

An exemplar GUI (Graphical User-Interface) layout and its components shown in FIG. 6A is designed to organize information from an extensive, complex data set. The special control apparatus maximize ease in retrieving subsets from the database. The navigation to the desired map can be accomplished via an optional index, 6901-6904 on the left by clicking on bar segments and list items. Retrieval Bar, 6101, for switching categories of mapsets and Retrieval Bar, 6102, for switching subcategories of mapsets call forth clickable lists of mapsets, 6103, within the selected category and subcategory. The example shows a list organized in alphabetical order. Retrieval Bar, 6104, is used for calling forth additional list information. The hilited segment designates the portion of the list that is displayed; clicking another letter calls up the portion of the list starting with that letter. Clicking on a map name in the list brings its base map into the Map Area. Orientation and navigation within a set of maps is accomplished via the Context Map, 6205 in lower right, which shows the location of the present map within the next higher level map. Clicking outside its toned area, calls forth the next higher level map (zoom-out). Zoom-in capabilities, 6205a, are provided via a key-accessed layer showing clickable zoom-in areas on the main map. Clicking on the "Home" icon, 6206 upper right, retrieves the top-level map of the mapset.

Figure 8A:
FIGS. 8A-8H depict layered indexes and keys with key extenders and retrieval bars to organize and access a large information set, FIGS. 9A-9D provide examples of informational advertising integrated into the present system including an interactive map-format user-activity report, FIGS. 10A-10H provide examples of a variety of map displays derived from the same database, FIG. 11 provides an example of a three-dimensional model as an interactive map in accordance with one or more embodiments.
Figure 8B:
Figure 8C:
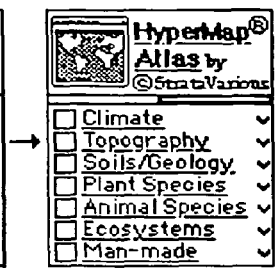
Figure 8D:
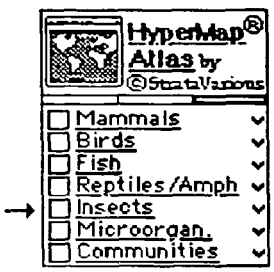
Figure 8E:

Upon retrieving the desired mapset with its basemap visible in the Map Area, the user may click on the Topic Selector, 6207, to retrieve site or object information for a particular topic in several ways. Clicking the underlined topic name will replace the base key with a topic-related key. Clicking on the box to the left of the topic name will call forth a query box in the key or as a pop-up (see FIG. 6B). Clicking on the down arrowhead will replace the topic list with a list of subtopics. The retrieval bar above the list shows the number of levels of topics and subtopics including and above the current subtopics list; clicking a segment will return to the higher-level topics list. Clickable keys are used to show and hide overlays to the basemap in the Map Area. The key, 6208, shows a set of symbols; when a symbol is clicked, the software calls to the database to show all that type of site or object positioned properly on the map. Keys for additional types of site or object are accessed by clicking on the "next" and "back" arrowheads at upper right of key, as shown in FIG. 8A.

Figure 10A:
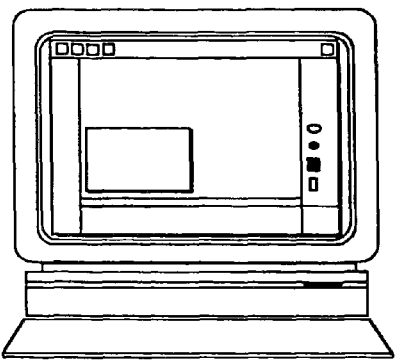
Figure 10B:
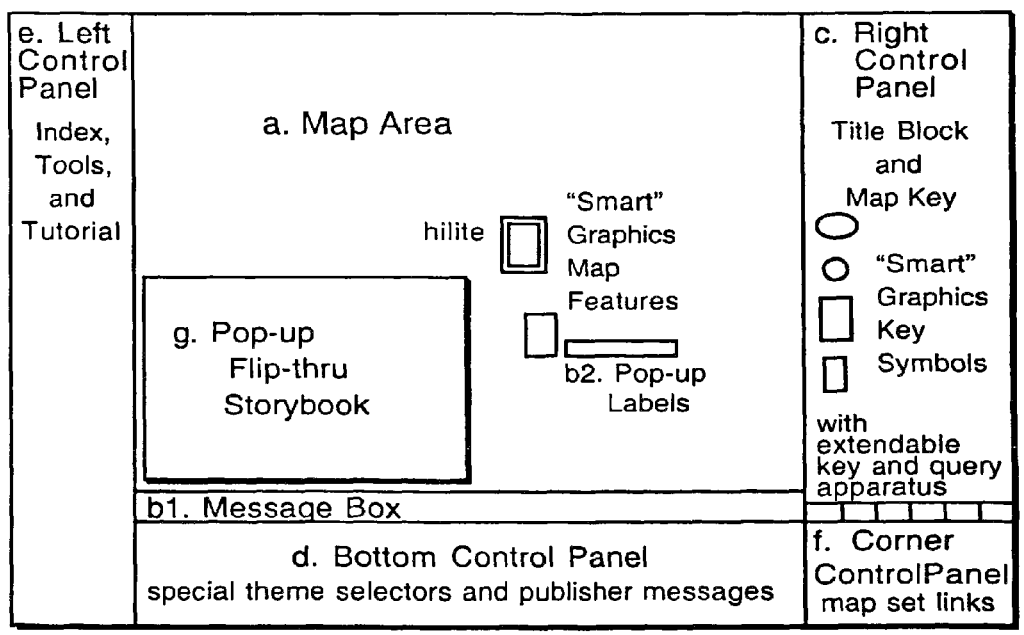

The central Map Area displays the content as sets of map symbols. Map symbols, 6109, for sites and objects with information in the database are "hot." Pointing at a symbol will call forth into the message box, 6110, the site/object's name and descriptive material. The message box is also used as a title bar to display the mapset title and subcategory title, as shown in FIG. 10A. Clicking on a map symbol will cause it to become hilited and a pop-up, 6211, to appear in a part of the map other than that in which the symbol is located. The pop-up has interactive, annotational material about the site or object. The material in the pop-up may be presented on multiple cards that are retrieved via the segmented retrieval bar, 6212, at the bottom of the pop-up. Special theme keys, 6113, may be provided below the map. Sponsor name and message, 6214, may also appear in this belowbar. Publisher, editor, and access to use, restrictions, and other reference information, 6215, may be located in the key or belowbar.

FIG. 6D shows a pop-up query box. The retrieval bar, 6301, is clicked to call forth lists of attributes. The attribute list, 6302, is clicked to select attributes which appear in the selections list, 6303. Clicking the "plot" button, 6304, causes the query box to disappear, the requested query to occur, and symbols representing sites or objects that have the selected attributes to appear in the map area.

Figure 6B:
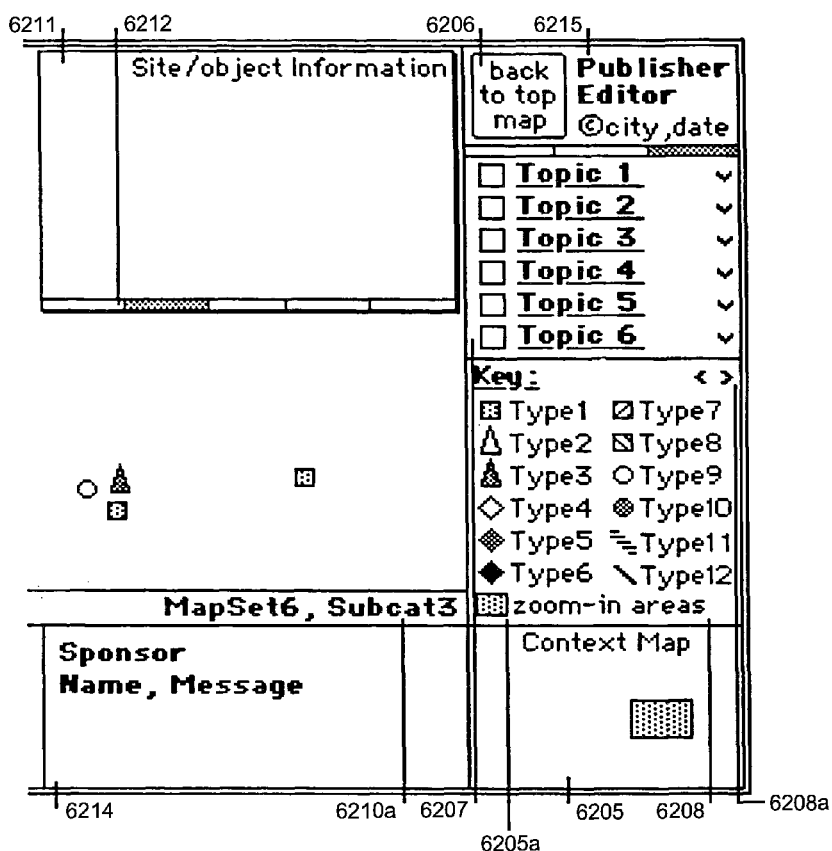
Figure 6C:
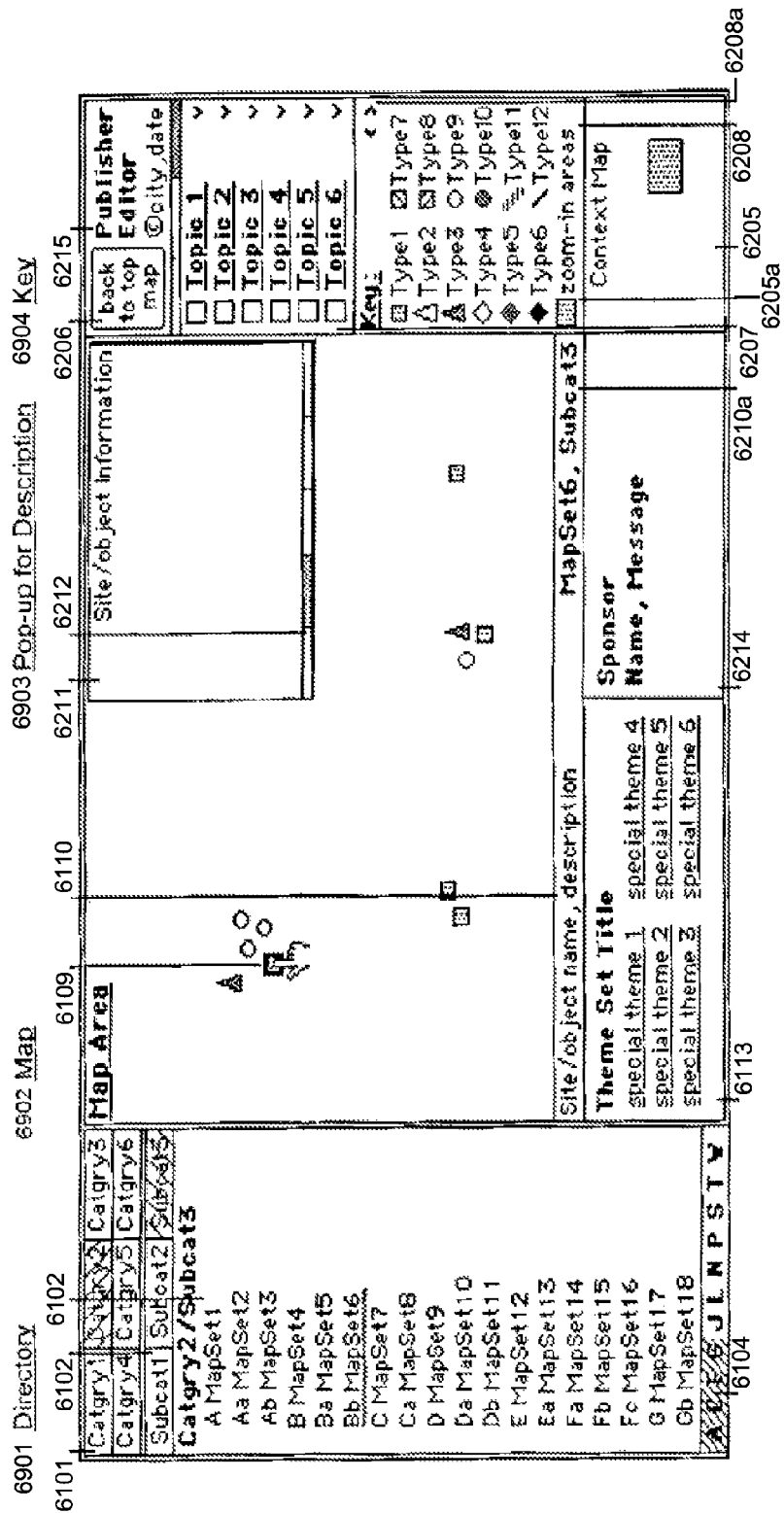
FIG. 6C is a small scale view of the linked partial views 6A-6B.
Figure 6E:
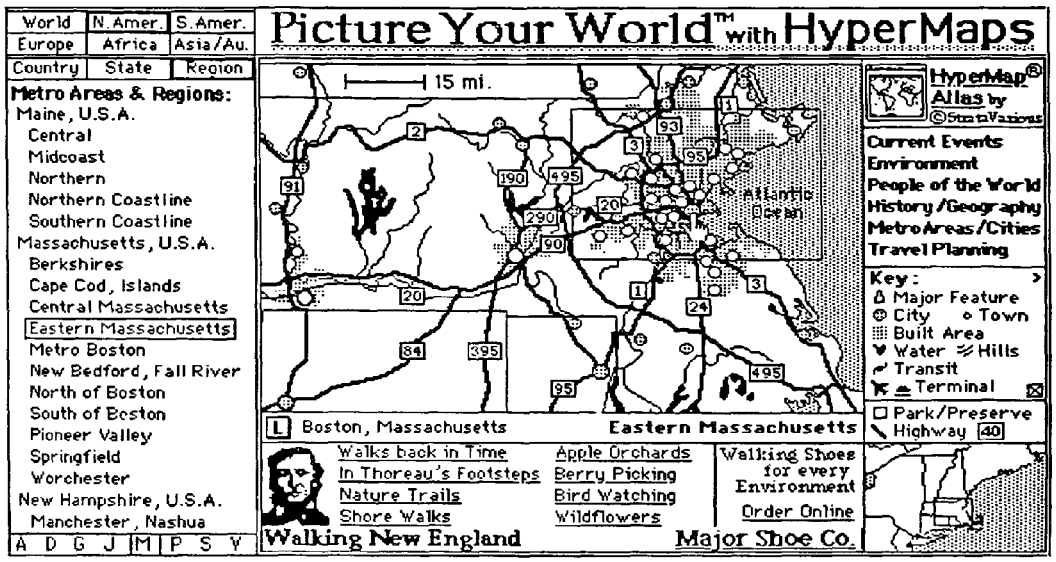
FIGS. 6E-6G depict alternative presentations with the inventive system.
Figure 6F:
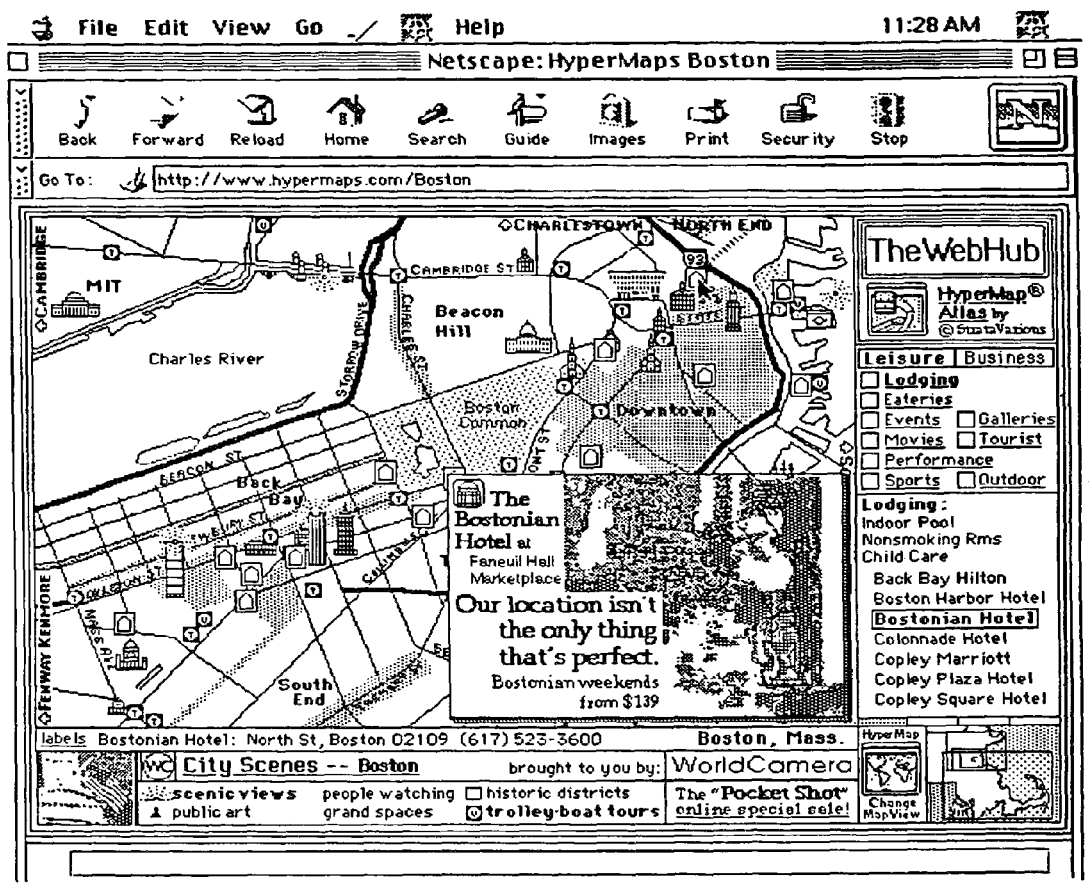
Figure 6G:
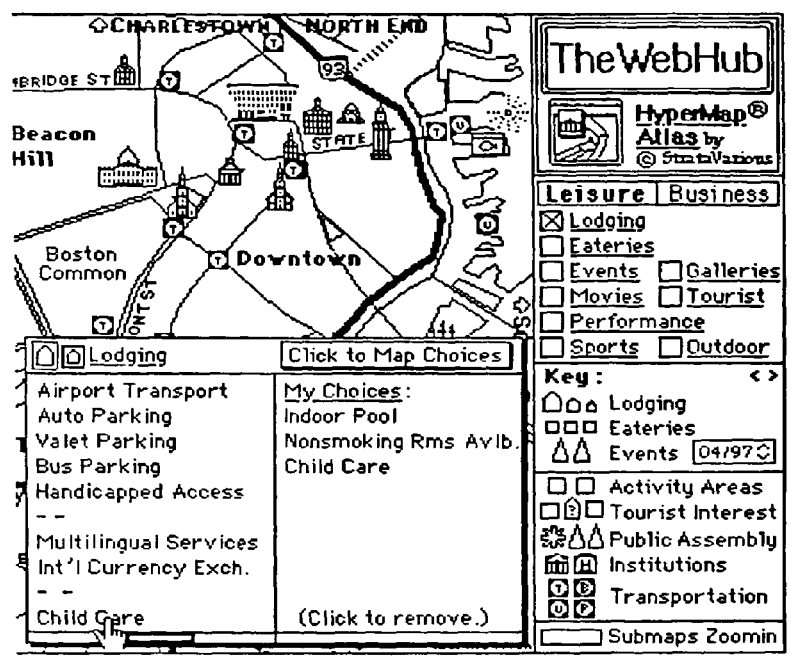

FIG. 6E shows an embodiment of the GUI layout with each of the components diagrammed in FIG. 6A-6B. FIG. 6F shows another embodiment of the GUI layout within a World Wide Web browser. The user has undertaken a search for a selection of hotels by clicking the box to the left of the topic "Lodging" and thereby called up the "Lodging" query box for selection of query criteria, as shown in FIG. 6G. A list of applicable hotels with a retrieval bar then appeared in the key area; this list may be clicked to have a particular hotel hilited on the map. The User has also clicked the key and special theme selector in FIG. 6F to view subway stops, trolley-boat tours, and scenic views. The user has then clicked on a hotel symbol on the map to view annotational material in the message box and pop-up, as shown in FIG. 6F.

Figures 7A, 7B:
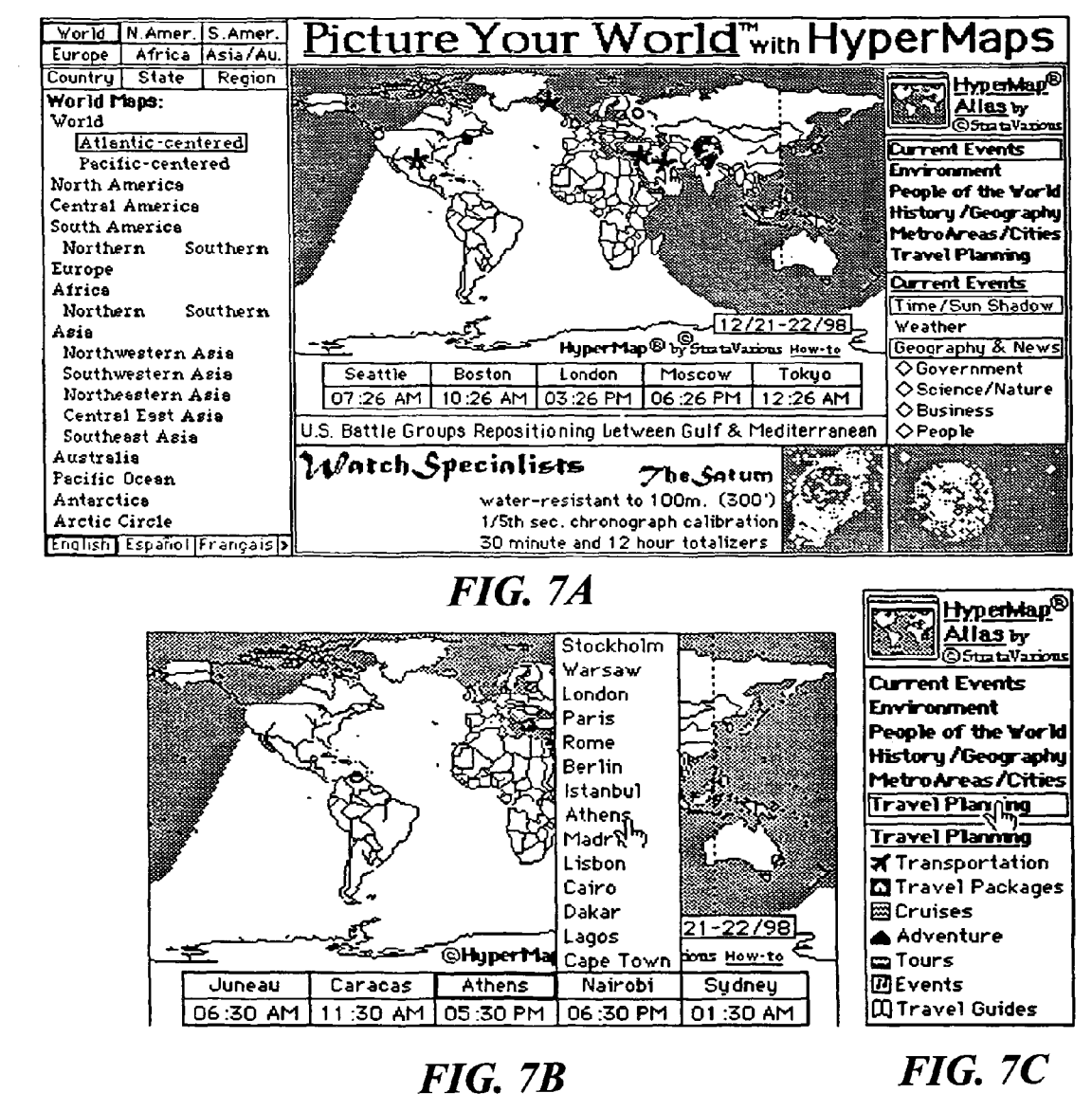

In FIGS. 7A-7G an example is provided depicting the use of the present system for assessing sophisticated geographic information. The series illustrates how a vast amount of information can be organized within a single, small screen and how its layered data can be retrieved by means of exemplar special control apparatus; The sequence begins with a user browsing a series of interconnected, geographic maps. Beginning with screen display, FIG. 7A, a base map of the world is provided in a two-dimensional presentation. This interactive, layered map can be easily reconfigured by the user. In this display, the control panel includes the following topics specific to the first base map:

1. Current Events
2. Environment
3. People of the World
4. History/Geography
5. Metro Areas/Cities
6. Travel Planning In this example, the User has selected the "Current Events" topic in the control panel, resulting in a second key of subtopics:

1. Time/Sun-Shadow
2. Weather
3. Geography & News
   a. Government
   b. Science/Nature
   c. Business
   d. People The user wishes to view the time in different cities of the world, weather, and news. As new data are called for, the system pulls from third-party databases and public information Web sites; and it dynamically refreshes the display with the most current entries. Pointing at a "hot news" symbol has called forth a headline in the message box; clicking it would call forth an interactive map of the news site in place of the world map. Further maps on weather as well as geographic information on news stories can be called up by clicking on the Current Events key. In FIG. 7B, the user changes the cities on the clock and map by clicking on a city name to call forth an overlay selector-list. The viewer selects a new city by clicking "Athens" on the list; the city circle moves to the position of Athens and the name and time of Athens replaces those of the previous city from that portion of the world map. Clicking the clock name again hides the selector-list.

Figure 7D:
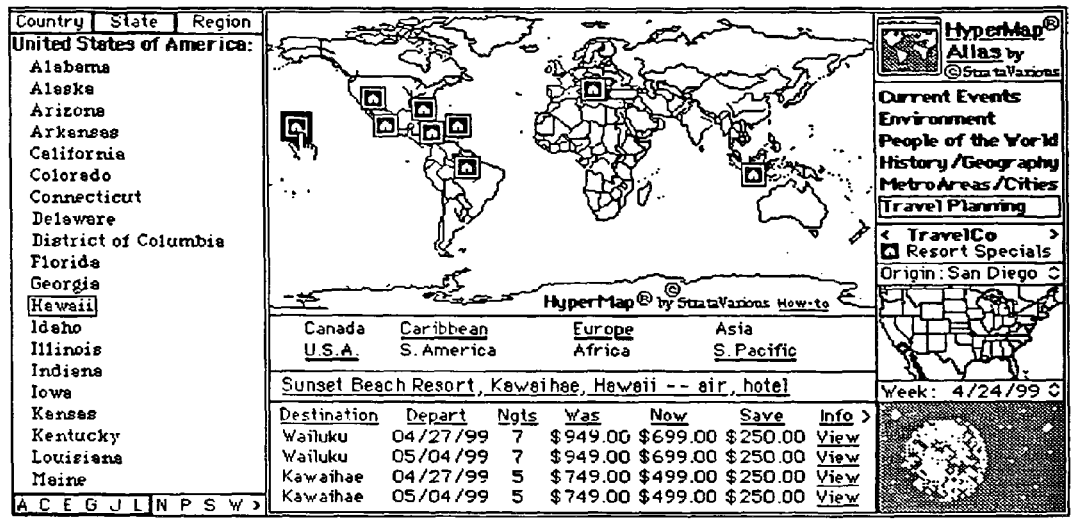
Figure 7E:
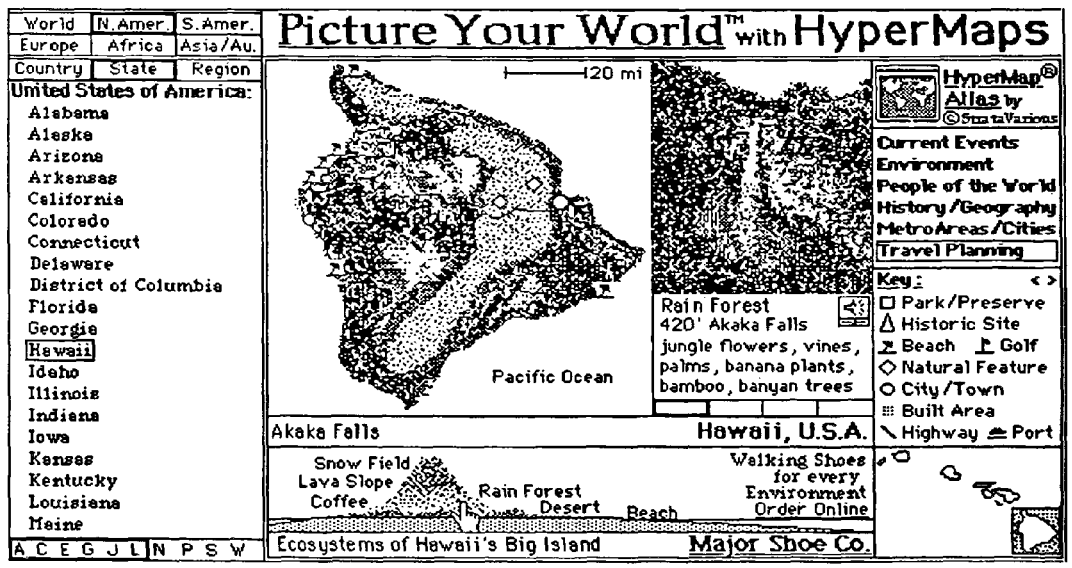

The interactive world map is also used as a directory to an extensive map atlas. The world map can be clicked to zoom into regional mapsets; or the index listing the map locations (to left of map) can be used (see FIG. 6A, 6101-6104). The index can be clicked to show other world maps; the retrieval bar at its top can call up lists of continent, country, state, and region maps. In this scenario, the user clicks "Travel Planning" on the topic index (to right of map) and the related key appears below, shown in FIG. 7C. The user then clicks "Travel Packages" in this key. FIG. 7D shows that a new control panel has now replaced the key (it can be hidden by clicking the topic selector "Travel Planning"). The > and < arrowheads in the key can be clicked to flip forward and backward to view additional travel packages. The user has selected a city of origin and a week by clicking on the up and down arrowheads. Symbols then appeared on the world map showing available trips. Pointing at the Hawaii map symbol has caused descriptive information to appear in the message box and belowbar (below the map). Clicking on the belowbar \> arrowhead would call forth data on additional packages. Clicking on "View" would place interactive descriptive maps, images, and text on top of the world map; clicking "View" again would hide the description. Clicking on a continent name below the map would call forth a continent map showing travel packages.

The user now clicks on Hawaii on the world map or the index of FIG. 7D. Note that an alphabetical retrieval bar can be used on the bottom of the location index (at left) to scroll through the list. The user has proceeded from a full map of the islands to a map of the Big Island of Hawaii, FIG. 7E by clicking on the context map at lower right. Clicking on the Beach symbol on the key has caused symbols for beaches to appear on the map. Clicking on the belowbar special theme selector has called forth an overlay showing the area covered by rainforest. Pointing at a natural-features symbol (for Akaka Falls) on the map causes its name to appear in the message box; clicking the map symbol pops up a description. The pop-up itself has several interactive features. Clicking the speaker symbol on the pop-up would run an audio/video clip of the waterfall in place of the photograph. Clicking on plant names would cause an image of the plant to appear in place of the waterfall. The retrieval bar at the bottom of the pop-up shows that there are four cards in the pop-up with the first showing; clicking other segments would call forth other interactive cards about the subject.

Figure 7F:
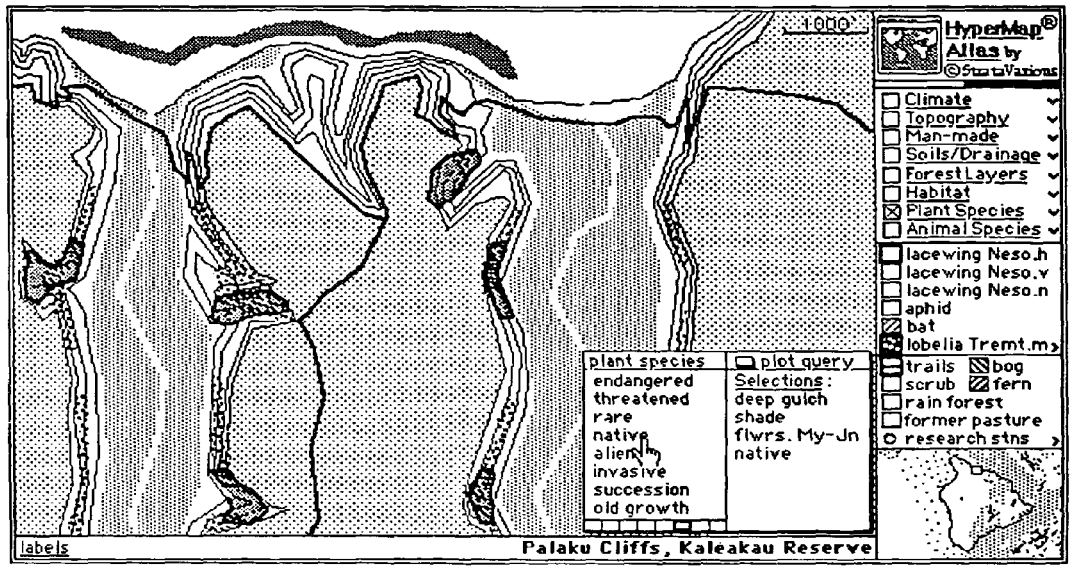

In FIG. 7F the user has clicked to zoom into a nature reserve and intersects with the mapset and database of the naturalists studying the area. The visitor can get a picture of what the hiking trails are like and learn about the ecosystems. The scientists create and study the interactive maps to discern relationships between various elements of the environment. In the example, a biologist compares overlays showing the location of plants and animals to study how they coexist. The biologist has selected specific insects and plants for display via the categories at the top of the key. He has chosen to view only the territory of one insect and one plant to study their interrelationship and their relationship to the general land form. Numerous other layers can be shown and hidden quickly via the key. In this way, only the set of material of interest at the moment is viewed, without distraction of irrelevant information. The biologist has clicked on the "Plant Species" key box to access the database. The query box has appeared and is being used to identify and map other species having certain criteria. The characteristics are clicked on the list at the left of the query box and they appear as selections at right. The retrieval bar at the bottom left of the query box calls forth other choices. Once all criteria are selected, clicking on the "plot query" button maps species that meet the criteria. A clickable list appears in place of the key, FIG. 7G; the list can be hidden and recalled by clicking on the "Plant Species" key label.

Figure 7G:
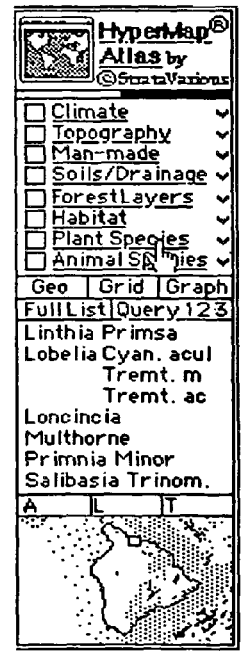
Figure 7H:
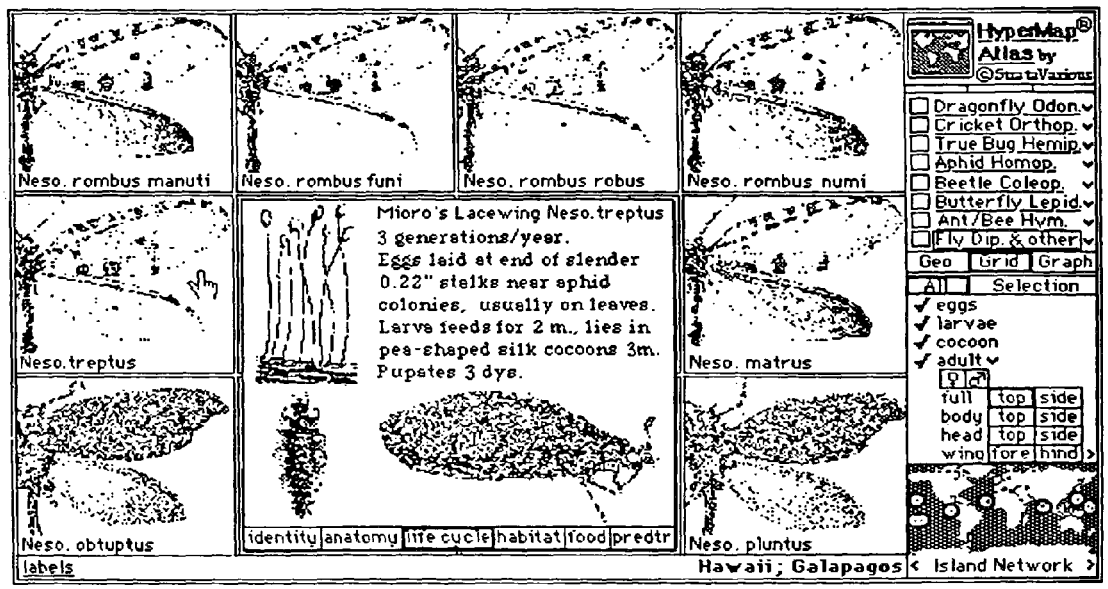
Figure 7I:
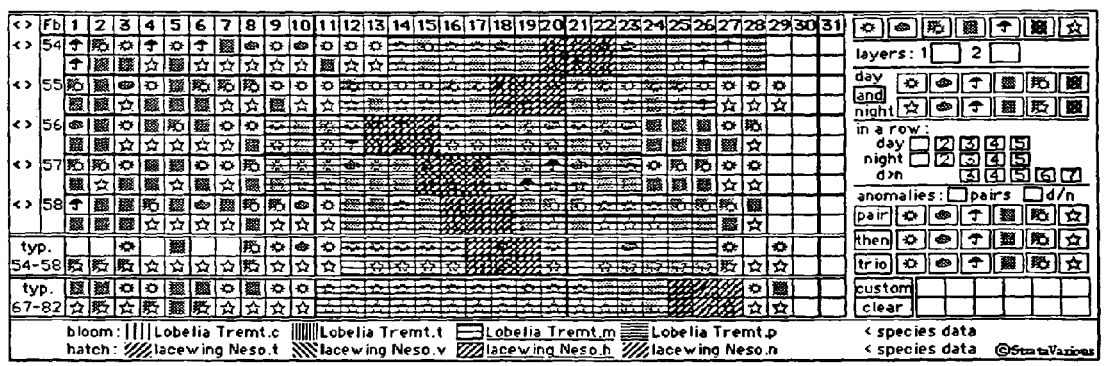

The results of the plant species query may also be viewed in a slotted map by clicking on the "Grid" or "Graph" selectors in the key, as shown in FIGS. 7G and 7H, shows a comparable display for a selection of insects. This type of slotted map serves as a catalogue for viewing and comparing objects side by side. The interactive key enables further queries and the showing and hiding of features. The hilite capability can call out a particular common feature on each image (e.g., the thorax, the wing's subcosta vein) and may gray the rest of the image. The material in the slots may be layered to show cross-sections of things such as an insect's internal anatomy. An interactive pop-up, flip-thru storybook provides descriptive material about each object; note the subject-headed retrieval bar. The biologist views images of plants and insects collected in the study area along with those that have been archived. The biologist can also access via the internet other researchers' information on similar species from islands around the world. Over the years, a database is compiled from field investigations. Weather data is collected and updated dynamically from field stations. The scientists have used the back-end interface to add their research data via both a database interface and a map interface. The biologist views a chart of weather data, FIG. 7I, onto which can be layered time periods related to biological processes. He looks for cause and effect by studying the hatching of an insect, the blooming of a flower, and the patterns of sunny, rainy, and foggy days via the species key below and the pattern analysis key at right.

Figure 8F:
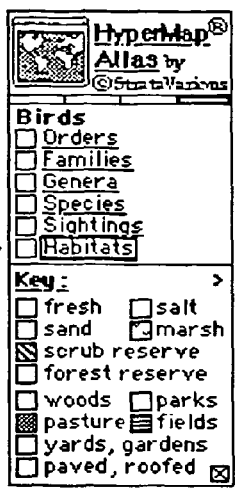
Figure 8G:
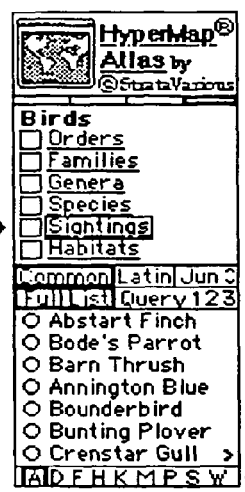
Figure 8H:
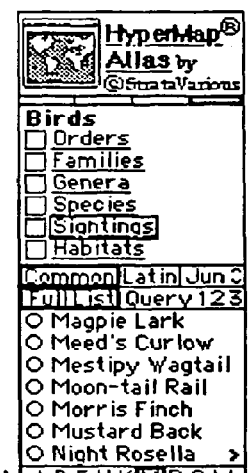

FIGS. 8A-8H show the use of layered indexes and keys with key extenders and retrieval bars to organize and access a large information set. FIG. 8A shows a sidebar panel with topics list and a symbol key. The > arrowhead on the key for FIG. 8A can be clicked to retrieve the key in FIG. 8B whose > arrowhead can access further keys and go back to the first key. If "Environment" is clicked on the topics list of FIG. 8A or FIG. 8B, the subtopics list of FIG. 8C appears. If the down arrow to the right of "Animal Species" is clicked on this list, subtopics list FIG. 8D appears. If the down arrow to the right of "Birds" is clicked on this list, subtopics list shown in FIG. 8E appears. The retrieval bars at the top of the subtopics lists indicate how many levels down the current subtopic list is; the bars can be clicked to move back up the hierarchy of lists. Clicking on the underlined subtopic titles in a list will show and hide its special key as shown in FIG. 8F and FIG. 8G. The retrieval bar at the bottom of the key in FIG. 8G and FIG. 8H alphabetically retrieves features. The retrieval bar switches features lists by other means, in this case by Common or Latin name, by month of the sightings, and by showing either the Full Listing of features or those from any one of three queries.

Figure 9A:
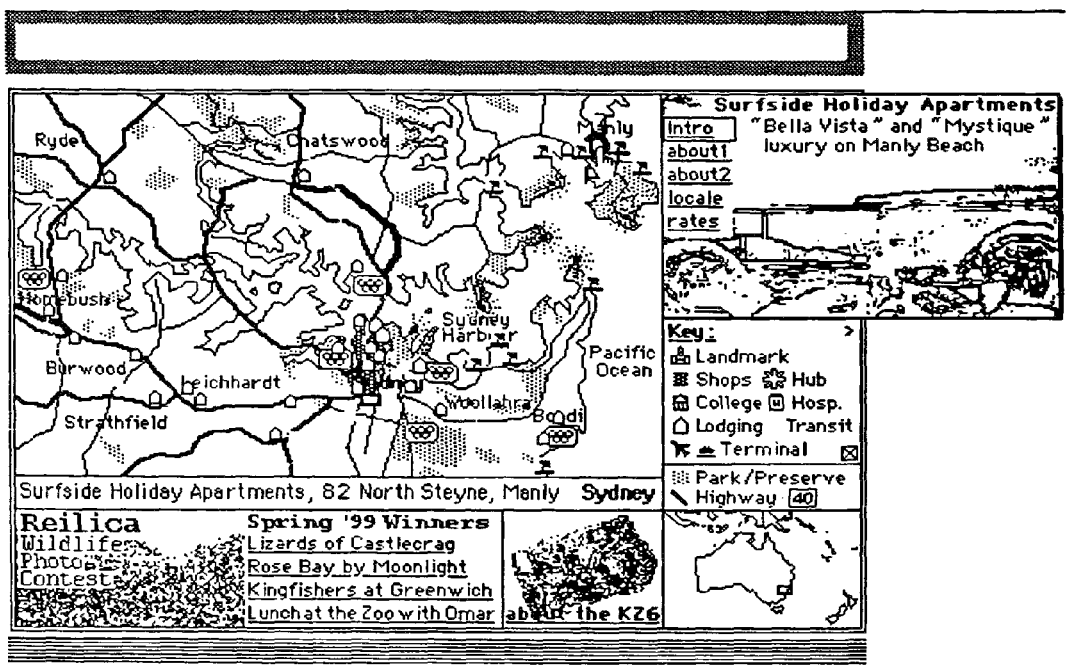
Figure 9B:
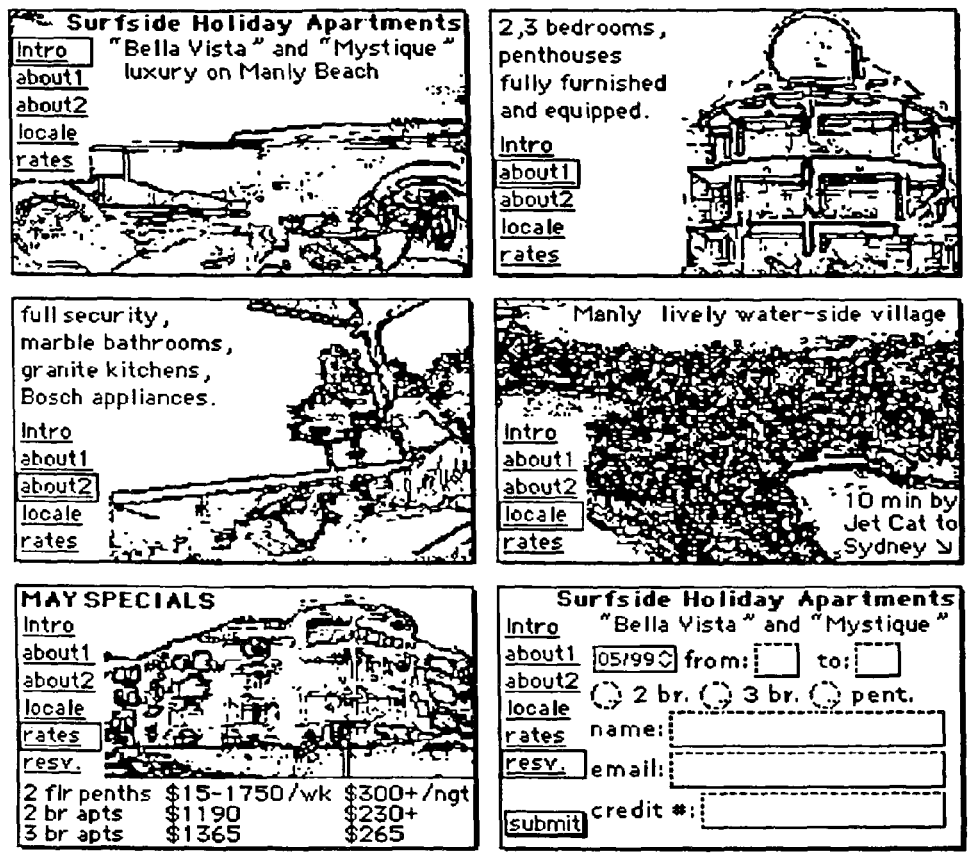
Figure 9C:
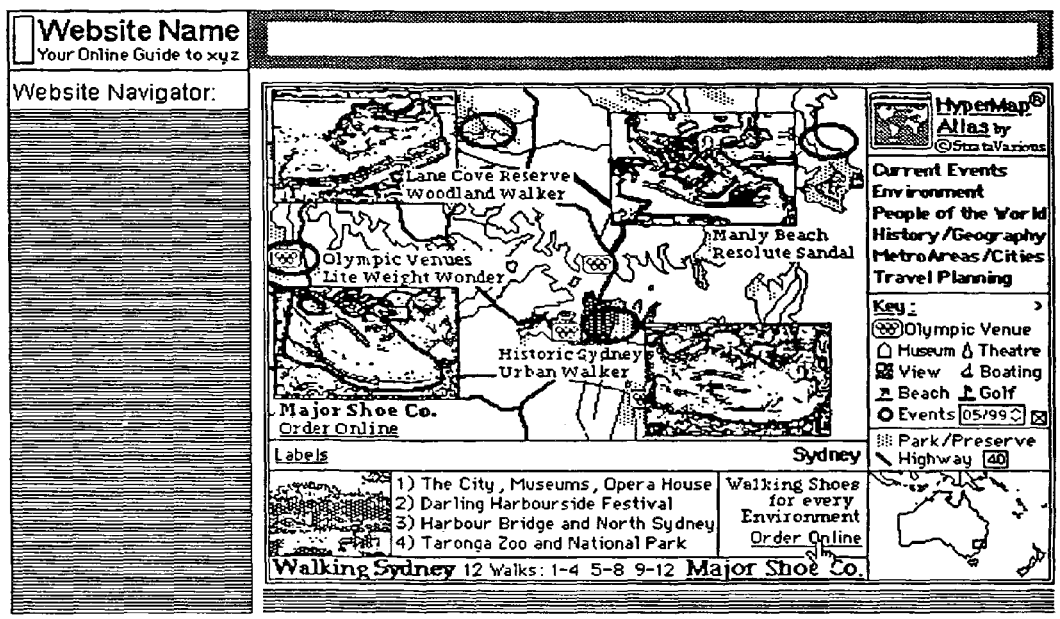
Figures 9D, 9E:
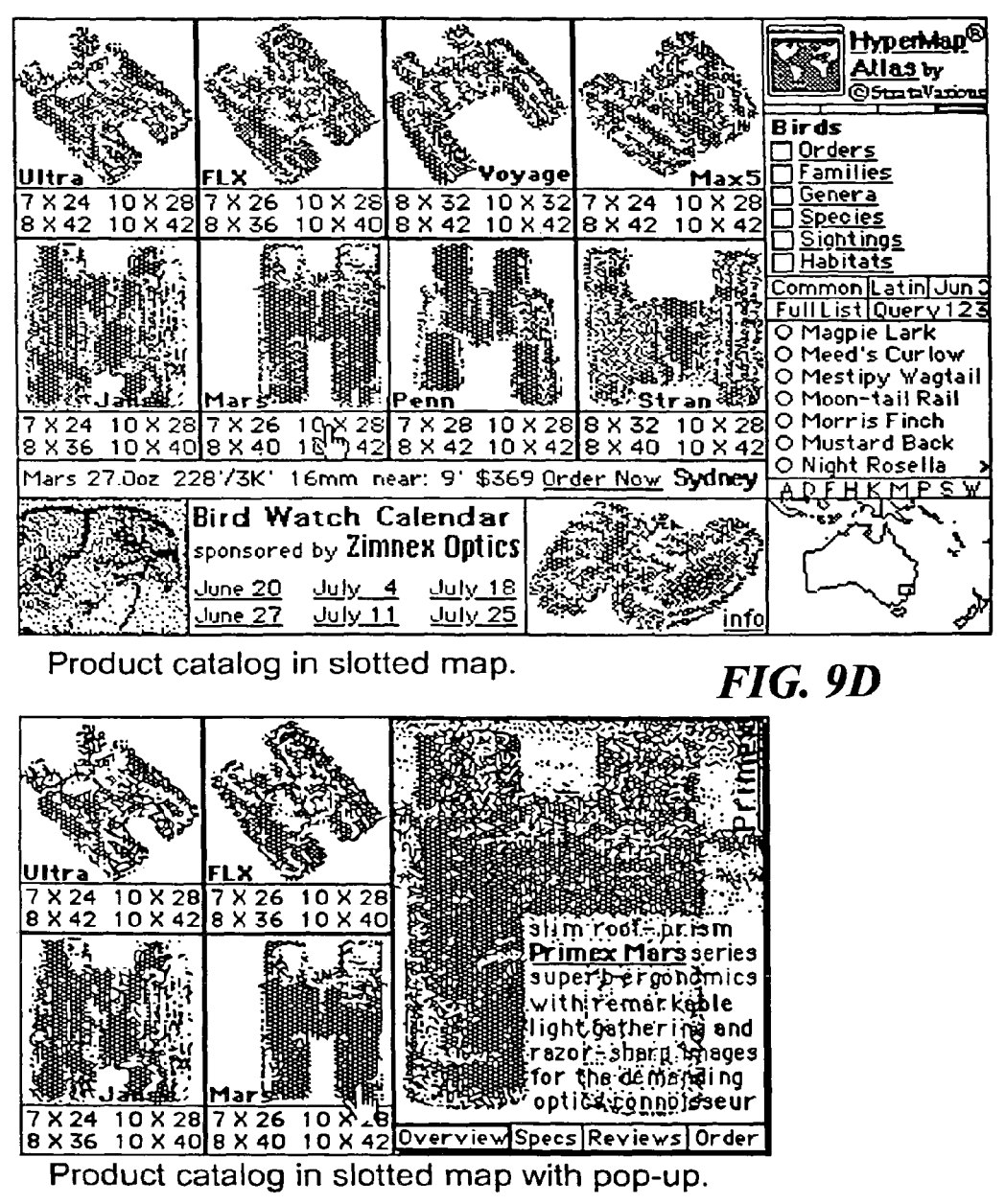
Figure 9F:
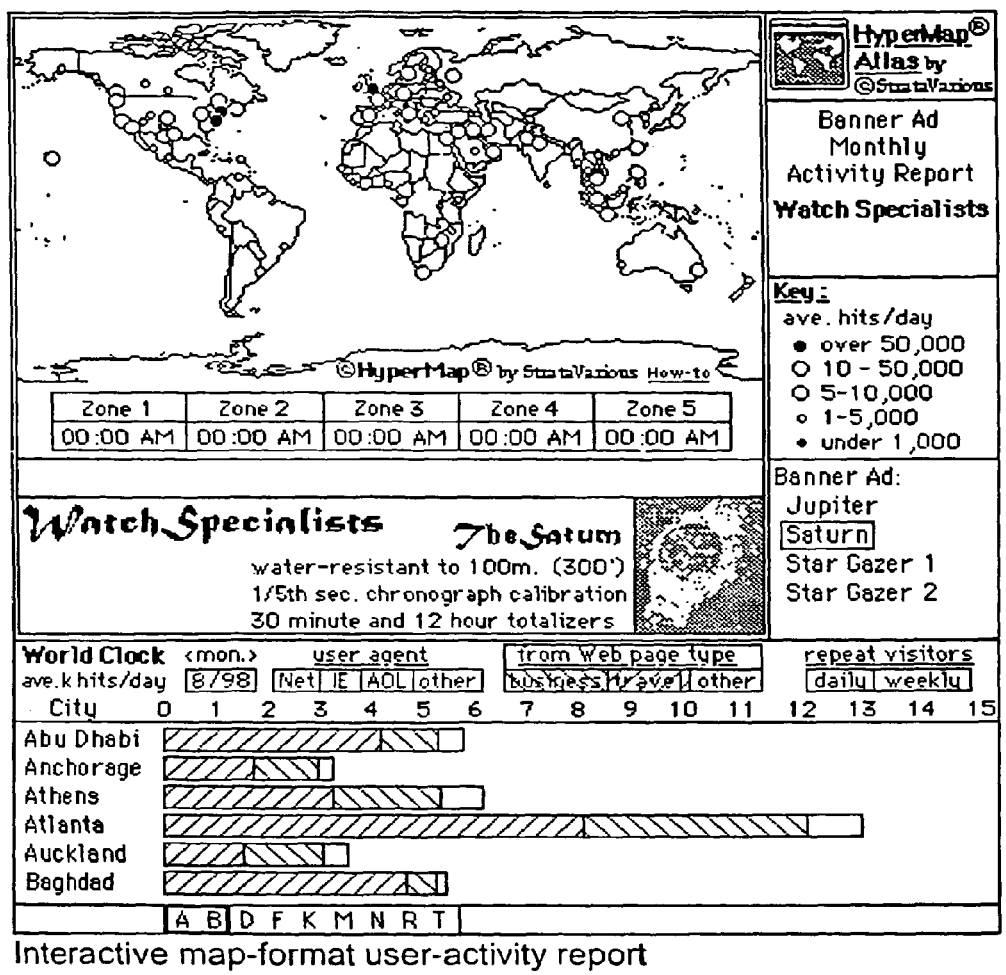

FIGS. 9A-9F show examples of informational advertising integrated into the present system. In FIG. 9A and 9B, a pop-up flip-thru storybook appears when the viewer clicks a "Lodging" symbol on the map; clicking on the pop-up's index replaces the pop-up with new cards as shown below. In another form of integrated advertising, FIG. 9C, the belowbar contains the key for a special theme, "Walking Sydney," while providing a "brought-to-youby" message of the walking shoe sponsor and a link to related product information and online ordering. Here the viewer has clicked on the sponsor's message and a map has appeared showing available walking shoes appropriate to a set of sites. In FIGS. 9D-9E, a slotting system is used in an online catalogue to present for comparison a category of products from many producers. In FIG. 9D, when the viewer called forth the "Birds" subtopics under the "Environment" topic, a binocular distributor's special theme selector and message appeared; then when the word "info" was clicked, a slotted map of binoculars appeared. In FIG. 9E, clicking a slot calls up an informational pop-up. FIG. 9F shows an interactive map-format report that plots information about viewers of ads that sponsored the world map illustrated in FIG. 7A. When a user entered the map atlas site, an id number was assigned to return the proper map layers; this system is also useful as a market analysis tool. The user-tracking system records anonymous user-activity that can be configured as such an interactive map-based report.

Figures 10C, 10D:
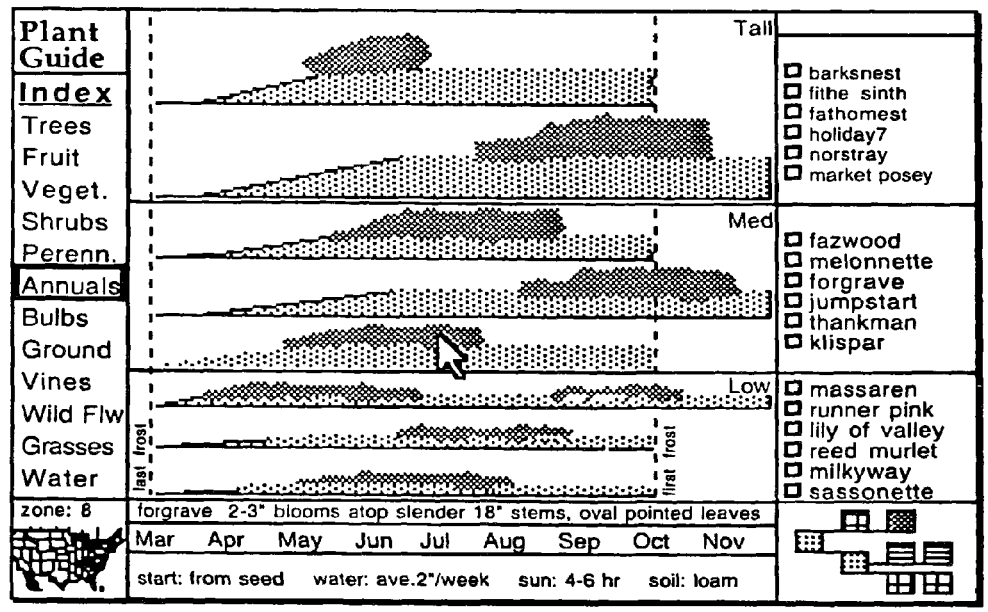
Figure 10E:
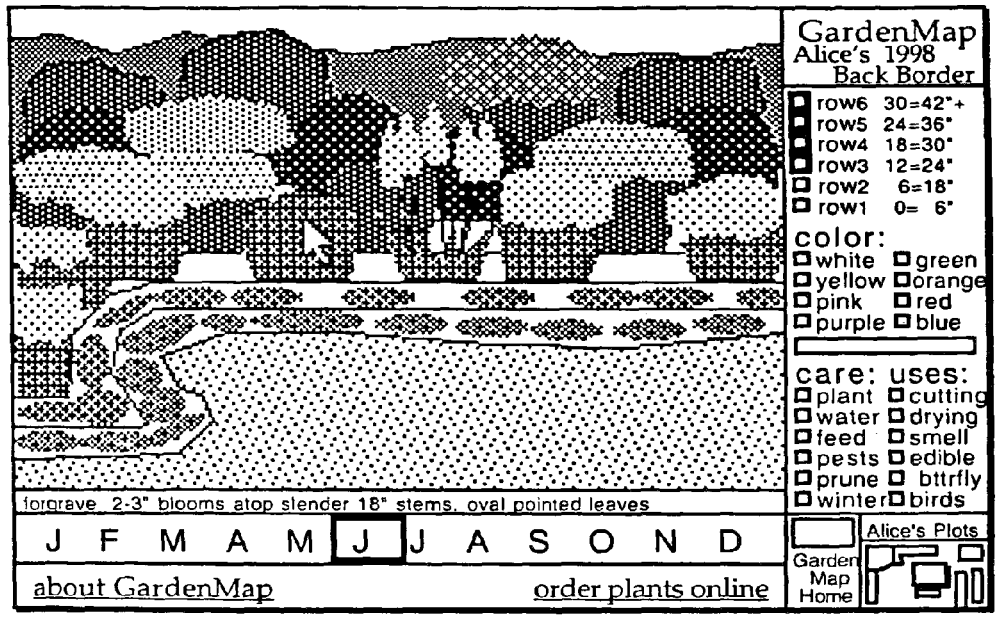
Figure 10F:
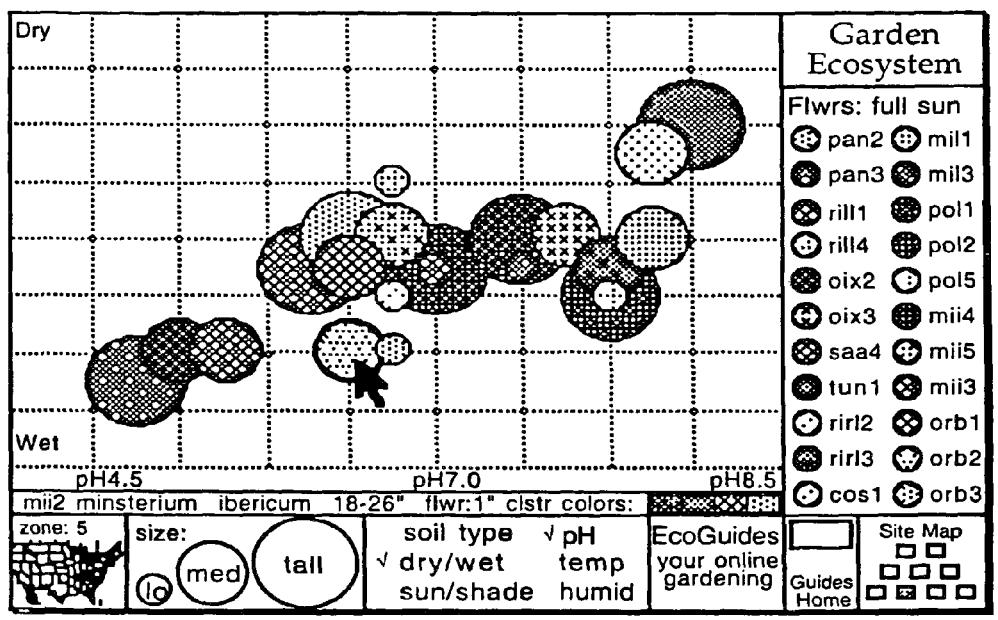
Figure 11:
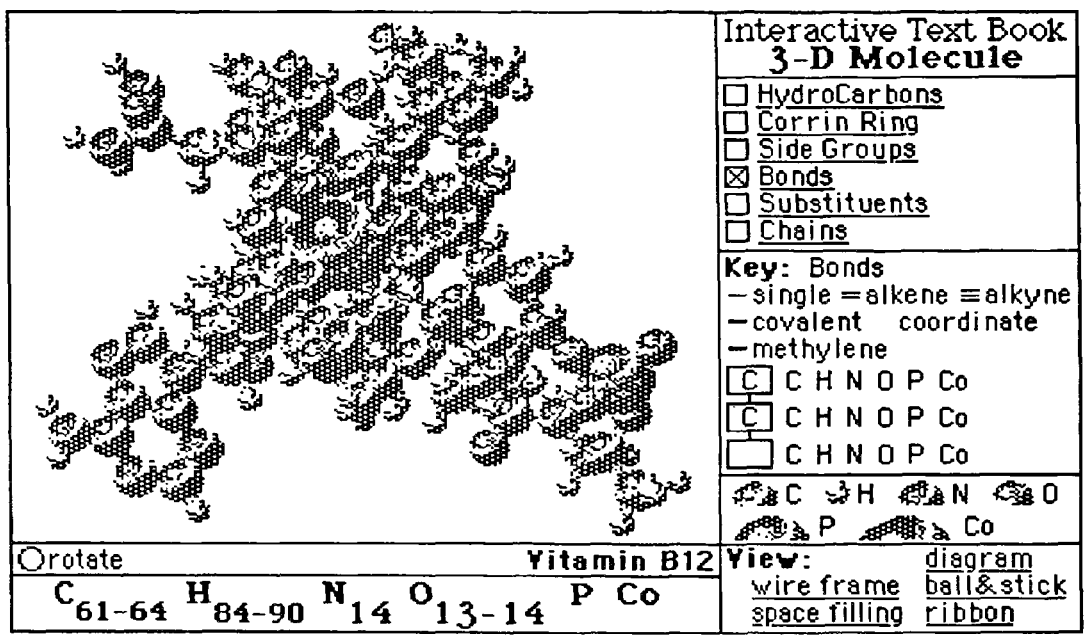

FIGS. 10A-10H show a variety of map displays derived from the same database. In FIG. 10A, the components of the graphical user-interface of the described embodiments are depicted as active regions on the screen of a User's workstation, 10001. In this context, the system provides frame components shown in FIG. 10B, including Map area (a), message box and pop-up label (b1 & b2), right control panel (c), bottom control panel (d), left control panel (e), corner control panel (f), and finally the pop-up storybook (g). A portion of a topical database is illustrated in FIG. 10C; five examples of maps created from this same database are illustrated in FIGS. 10D-10H: exemplary use of the framework components are provided in the slotted map (FIG. 10D), layered map (FIG. 10E), slotted and layered graph map (FIG. 10F), gridded matrix and use of pop-up storybook (FIG. 10G), and layered and slotted map with use of pop-up query box (FIG. 10H) for selective display of information relating to gardening. FIG. 11 shows an example of a three-dimensional model that can be rotated. With the addition of a topics list and key, it becomes a "map" and has feature and attribute data that can be shown and hidden, hilited, queried, and annotated.

FIGS. 12A-12F show a second exemplar GUI (Graphical User-Interface) layout and its components that are designed to aid users in collecting, organizing, and studying information while viewing and manipulating one or more documents. With the various embodiments, the document's function and usefulness are expanded to serve as the map's control panel or key. The control panel with the document depicted in FIG. 12A block 1201A is in a portion of the display while the map area shown in FIG. 12A block 1201B is in another portion of the display. The document in the control panel may have an index or directory, as described in FIG. 6 6101-6104 for retrieving different documentsfor display. As well, the map may have an index as described in FIG. 6 6205-6208. The slotted and layered map is used to hold symbols that represent portions of content from the documents as the user searches or studies the documents. The document in the control panel has special control apparatus and "smart graphics" that make the document a variation on a clickable key. As with a layered, symbol-list key illustrated in FIGS. 2-4 and FIGS. 6-11, by using special control apparatus inserted into the document, the user requests "smart graphics" with data attached to fill slots and layers of the map area.

Figure 12A:
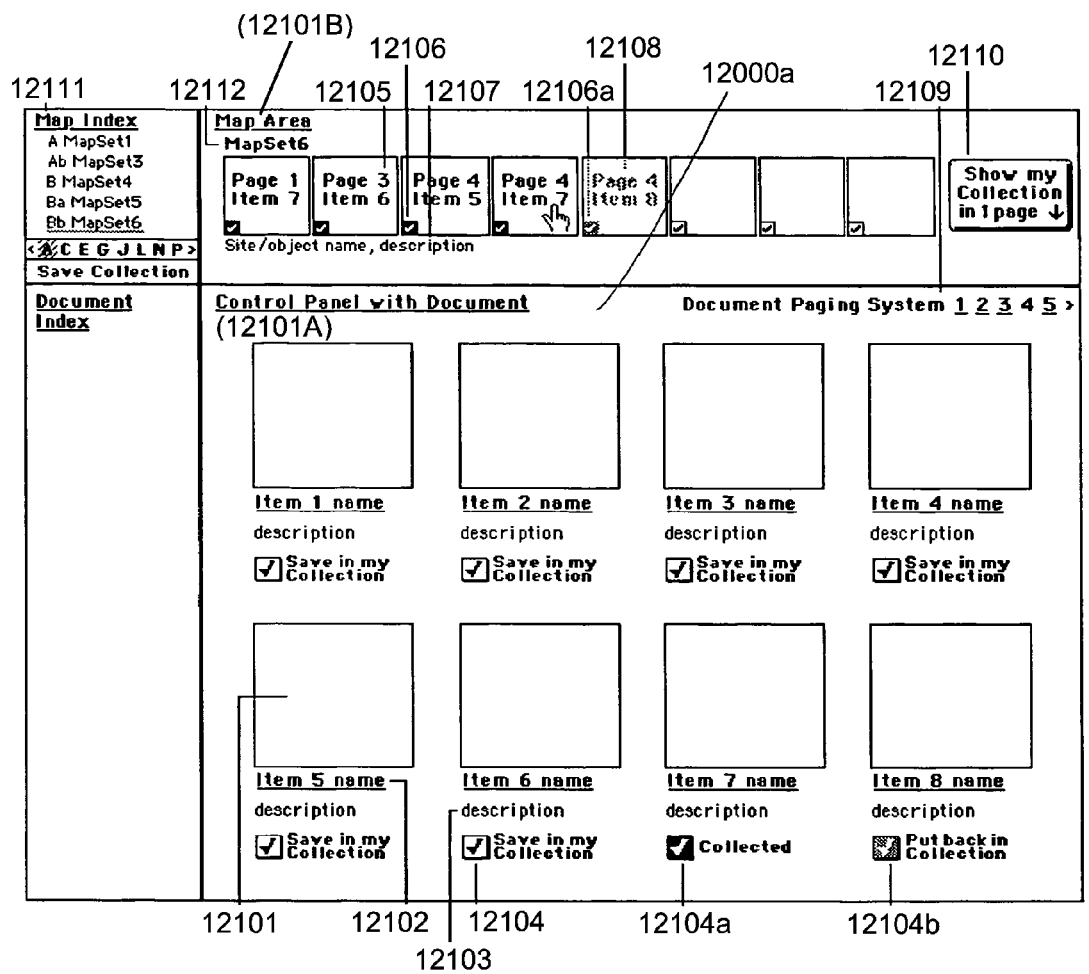
FIGS. 12A-12B provide examples of an alternative configuration of the GUI components in accordance with one or more embodiments in which special control apparatus are inserted within a document to serve as the means of access to data for the user to collect and view in the slots and layers of a map.

In FIG. 12A, the user signals the request to collect a symbolic representation of a portion of the document's content by clicking a checkmark button 12104b, dragging an image 12101 or text 12102 up to the map area 12112, or by some other method. The symbol then appears in a layer or slot 12105 in the map; and the system alters the look of associated graphics such as hilites, checkmarks 12106 in the map area 12112 and checkmark 12104 in the control panel area 1200a, and labels in the map area 12112 and the control panel area 1200a. The user can then study, rearrange, and change the look of the collected symbols to aid the analytical thought process and gain insights regarding patterns and relationships of the represented content. Because the map contains "smart graphics" carrying data about the collected items, the user can request, for instance by clicking on a symbol or on a button, to have related data displayed in the control panel area 1200a in place of the existing document. These data may be previously viewed content, representations of the collected content, an altered formatting of the content in the document, or a layered and slotted map. The special control apparatus such as checkmarks 12104, 12104a, 12104b and buttons in the control panel area 1200a and map area 12112 maximize the ease and flow of collecting and altering map symbols and then in altering the content or look of the control panel area and its document.

The collected image and text symbols may be organized in a set of slots 12105 in the map area 12112 as shown or in another slotted and layered layout. These "smart graphic" symbols carry data about the content they represent. They may be "hot" in that user actions towards them using devices such as a cursor, keyboard, or touch screen will trigger a change in the display. Pointing at a smart graphic symbol may call forth into the message box 12107 a name, title, or other descriptive material associated with the content represented. Clicking on a map symbol may bring forth additional information by one of several means. Clicking may cause a slotted and layered pop-up to appear as described in conjunction with FIG. 6A, and with FIGS. 11-12F. It may also cause a smaller, movable document to appear in front of the control panel area, or cause a change of content and/or look in the control panel area 1200a document. Pressing on different keys in the keyboard or some other user-input apparatus may be used to switch between these different means of accessing annotational data in varying formats.

The "smart graphics" symbols can inform an intelligent agent to bring more data like those data previously collected in the map into the control panel area or otherwise transform the content and/or look of the document in the control panel area based on what has been collected. The intelligent agent may also employ fuzzy logic to bring similar data into the control panel area if the data does not strictly match the previously-collected data. The degree of matching may be set by the user, by software, or by other suitable means.

Due to the unique identifier (ID) and data attached to or associated with the symbols, the user may explicitly request the display in the control panel area of a set of data represented by the symbols collected. For example, to collect a set of representations to be isolated for study as shown in FIG. 12A, the document in the control panel area 1200a consists of a number of pages accessed by a document paging system 12109. In this example, each page contains several items; each item may have its own image 12101, name 12102, and description 12103. A "Save in My Collection" checkmark 12104 is included for each item, thereby turning the document into a control panel or key. This checkmark 12104 is a "smart graphic" in that it has data attached relating to the item, for instance its database ID and categories, its name, price, and other descriptive data along with the path and name of its image and link to its product page. When the checkmark 12104 is created as the page is drawn or when the checkmark 12104 is clicked, this data is inserted into a database for use by the system in accordance with various embodiments.

In the process of viewing each page of the document, the user has checked "Save in My Collection" checkmark 12104 associated with content items in the document on three different pages. Each of these user actions has filled a slot 12105 in the map with a "smart graphic" symbol representing the content (image, name, and description) for each item. The symbol may be the item's name, its image, a smaller version of its image, or another representation. The user can drag symbols between slots to rearrange them as part of the analytical thought process. To remove an item from the collection, the user can uncheck a hilited checkmark, for example, "collected" checkmark 12104a or "Page 4 Item 5" checkmark 12106, or another button or label. Alternatively, a symbol for a removal area (such as a trash bin) may be provided into which the user can drag the item to clear it from the collection. Instead of completely deleting a collected item, unchecking it can cause the system to place a layer with a white or colored screen 8 above the image or text in the slot. By "greying out" the symbol or diminishing its clarity in some other way, the symbol remains in view in case the user changes their mind; then they can click the "put back in collection" checkmark 12104b or re-select checkmark 12106a again to fully reinstate the symbol in the collection. When all the collection slots are filled, new items to be collected can be inserted into the greyed out slots. Limiting the number of slots available for collecting items can cause the user to hone their search by having to make choices in a process of elimination. Alternatively, the impression of having extra spaces to save items can be provided by using clickable arrows or another method to bring additional items into the slots to give the sense of scrolling through a set of items longer than the number of slots. As another alternative, additional slots may appear when the slots initially provided are filled or the map area may be enlarged to show additional slots.

Figure 12B:
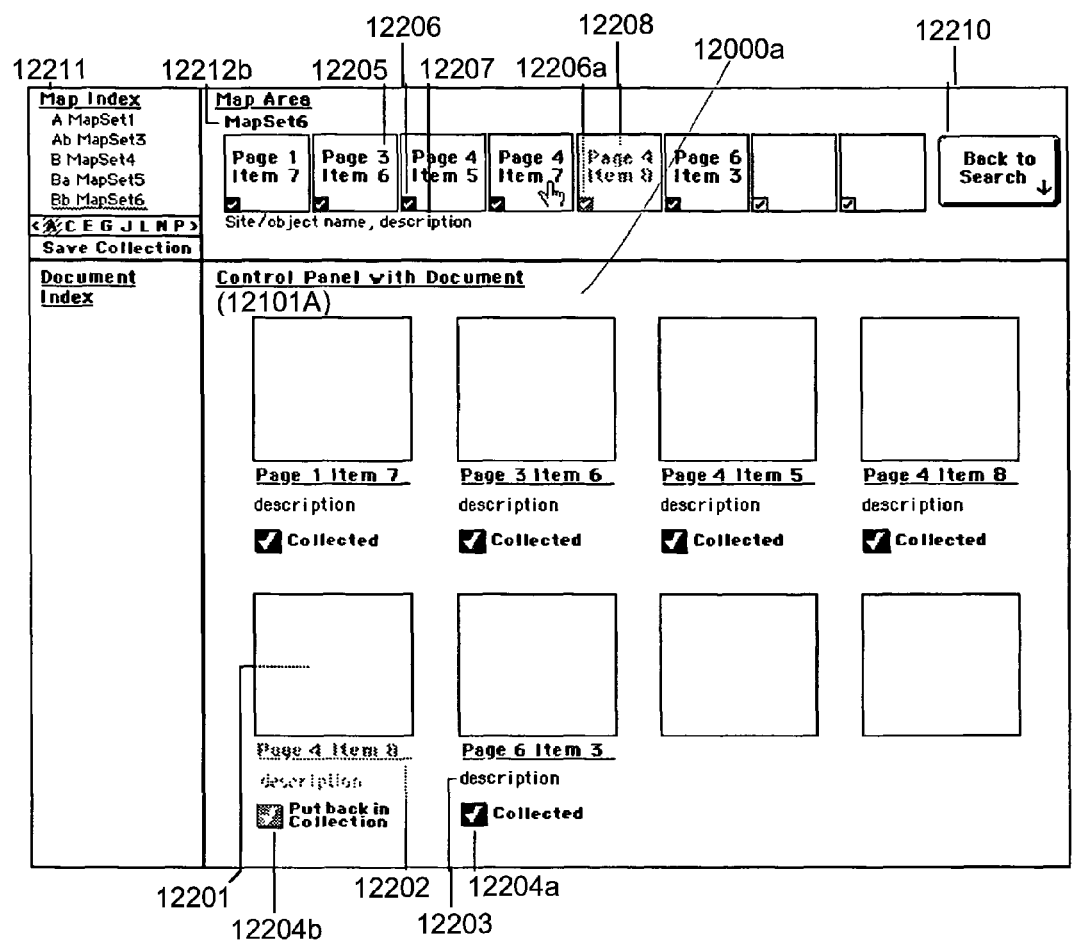

Referring also to FIG. 12A and FIG. 12B, a shopper may wish to view an enlargement of an item's image 12101 or additional text or images relating to the item. On a typical World Wide Web site, a shopper expects to click the image 12101, its name 12102, or a similar button to go to a product page with more in-depth descriptions and access to an ordering system. In this environment, a product page would replace the document in the control panel area 12000a, so that the map showing collected items is still in view for reference. From the product page, an item may be collected in or removed from the map, for instance via a checkmark inserted into the product page.

By a means such as clicking the "Show My Collection in 1 Page" button 12110 in the map area 12012 or control panel 12000a, the user can request the control panel area 12000a to be filled with the image, name, and description of each of the collected items, as depicted in FIG. 12B. Thereby, the user can further study the patterns and relationships of the collected items to gain insights and make choices while viewing all of the items together and without the distraction of other information. The control panel document can be a slotted and layered map, enabling the user to drag symbols between slots to rearrange them and remove or grey out items as part of the analytical thought process.

Multiple map collections may be created by a user and interchanged smoothly. The navigation to the desired map may be accomplished via an optional slotted and layered map index 12111 as described in conjunction with FIG. 6A, 6101-6104 or via another suitable indexing system such as a row or rows of file-like tabs. A slotted and layered topic selector and key as described in FIG. 6B, 6207-6208 and a pop-up query box as described in FIG. 6D may also be included. A slot for a title 12012 within the map area is used to display the mapset title and subcategory title.

FIG. 12C shows an embodiment of the GUI layout for a World Wide Web site with each of the components shown in FIG. 12A. The same method and system could apply to shopping across numerous web sites. While browsing through pages of items, the shopper collects possibilities in the map area slots. As the shopper proceeds from page to page, they can view the smaller representations and message box text to be reminded of what has been collected from previous pages. They then can view all those items collected in the map at their original size in the control panel area for comparison to make a final selection. If the control panel document is a slotted and layered map, the shopper can press and drag to switch items within the slots and study particular images next to each other.

Figure 12D:
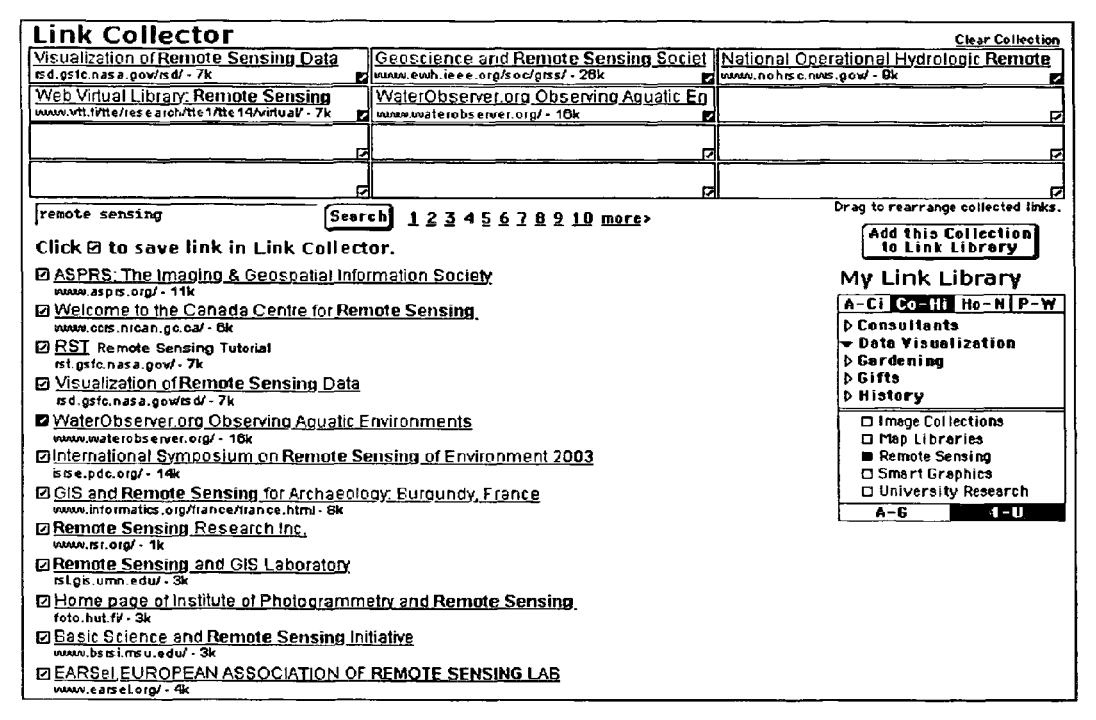

FIG. 12D illustrates an example of a digital document library, a World Wide Web site, or an Internet or intranet search and collect tool. In any of these cases, a user searches for documents containing requested content and is presented with a list of documents of potential interest. From this list, the user can expect to call forth a document to view, replacing the displayed list with the individual document. With the addition of a map area, map index, and control apparatus such as checkmarks within the search results document, the library, web site, or search tool becomes another embodiment of the GUI layout. By providing a control apparatus such as the selection of a checkmark or dragging the listing text into a slot in the map area, the present invention enables the user to save (in the map area) a representation of a document in the list. This representation may be all or a portion of one of the search listings or "links". It may also be a visual representation of the document such as a thumbnail screen shot or one or more graphics or colors symbolizing categories and topics. Clicking a hilited checkmark will grey out an item or remove it from the collection. Upon clicking a link and viewing the actual document, the link may be collected via a checkmark inserted into the document, by dragging the document into the map, or by another method. Additional features such as a map index and marking tools further enhance the Link Collector as a facilitator of research and analysis.

In the two examples of a search for products and information depicted in FIGS. 12C and 12D, the users are seeking a match or set of matches to something they have in mind. As with current document and World Wide Web searches, they go from page to page scanning images, lists, or text looking for potential matches. However, with the various embodiments, users may collect visual representations of possibilities in the map area slots instead of having to try to remember them in their mind's eye and getting overwhelmed, lost, and confused. This ability to see representations of possible matches as they search improves the flow of their thought, decision-making, or shopping process. The ability to reposition and alter the look of certain slots and of their content (e.g. color, greying, bolding) aids the process of categorization, comparison, and selection. An intelligent agent, informed by what is being collected, can bring more like those collected into subsequent pages to further enhance the flow, quality, and success of the quest. The various embodiments may also be used to collect items or links while searching across several digital collections or World Wide Web sites.

Figure 12E:
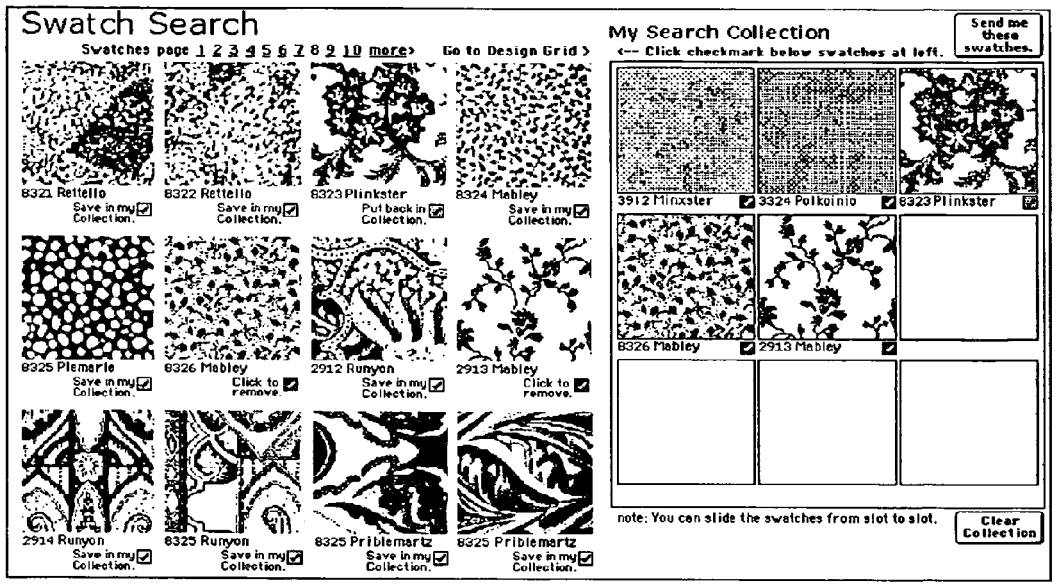
Figure 12F:
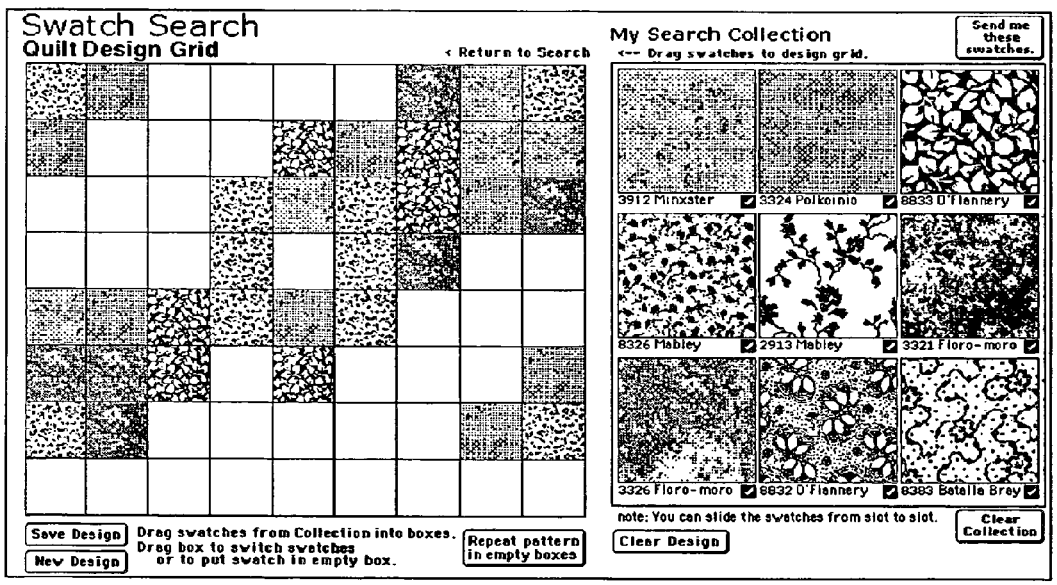

FIG. 12E shows yet another embodiment of the GUI layout with the map area to the right of the control panel area that displays a set of pattern variations. In going from set to set, the user has looked for and collected patterns that "go together" to create a collection of items with a particular look. FIG. 12F illustrates how, after accessing a second control panel configuration, a user can change the content or look of the control panel area via the collected data. In this case the user has clicked on the "Go to Design Grid" link. In place of the search document in the control panel area, a second map consisting of a blank grid of slots is displayed. The user drags images into and between the slots in order to design a quilt from collected fabric swatches or a floor layout from collected tiles. This method of collecting possibilities and then designing or studying alternative combinations within a second slotted and layered map that replaces the control panel may be applied to other analytical, creative, and educational activities such as: 1) collecting furniture, then moving the pieces into and around a two- or three dimensional floor plan in a second map to design a room; 2) collecting plants, paving, and garden features, then moving the elements into and around a two- or three dimensional site plan in the second map to design a landscape; 3) collecting images of different articles of clothing, then placing and viewing them on a paperdoll-like diagram, photograph, or three-dimensional model in the second map to put together an outfit; and 4) collecting images of ancient pottery shards, then placing them within a timeline chart depicting different civilizations in the second map to do a lesson or to gain new insights about history.

Figure 13A:
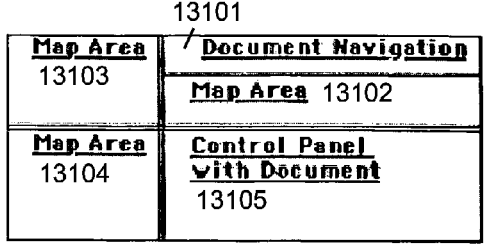
FIGS. 13A-13B provide additional examples of graphical user interface (GUI) components in which both a document with special control apparatus and a set of symbol-list keys are the means of access to data for the user; and the user collects and views representations of these data in the slots and layers of several interrelated maps which may be of different forms such as a gridded chart, a graph, and a layered graphic in accordance with one or more embodiments.
Figure 13B:
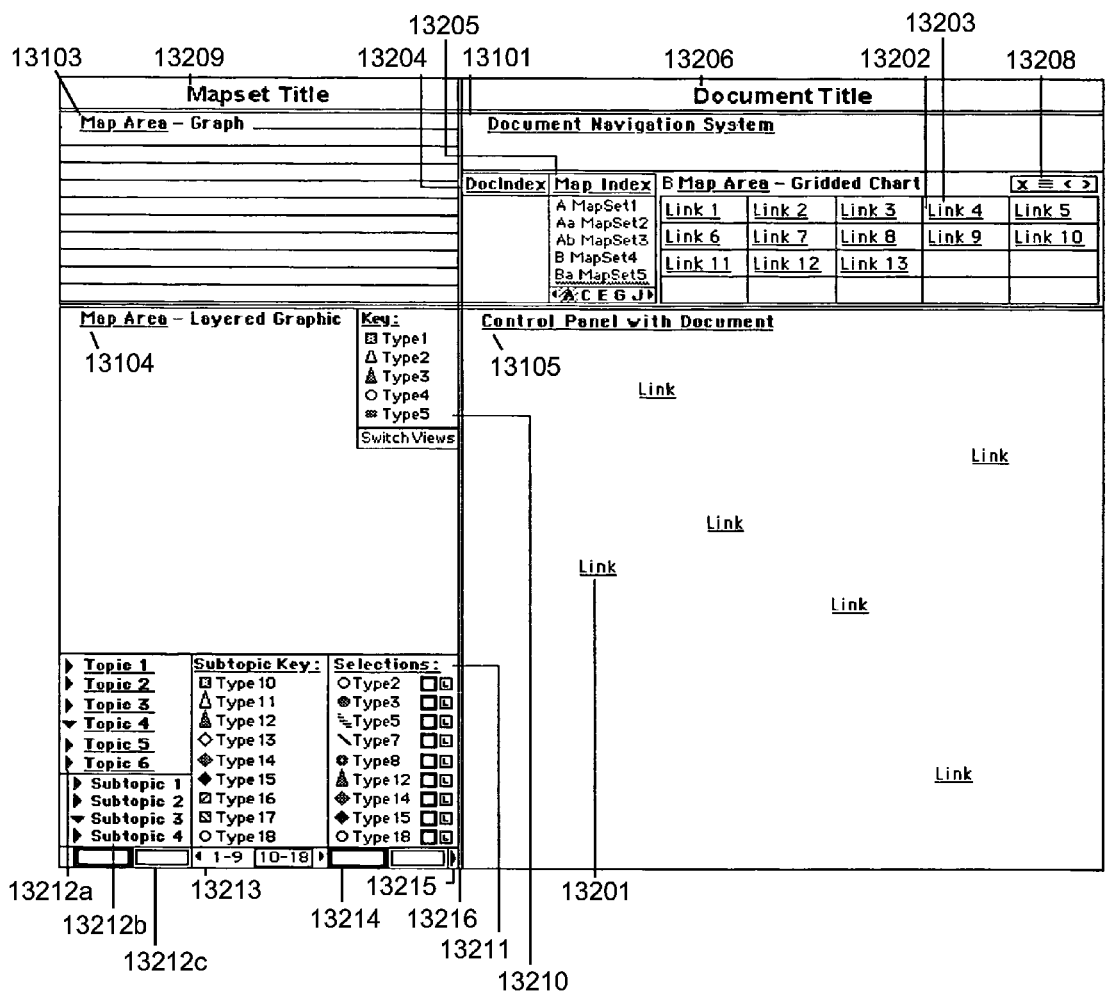
Figure 13C:
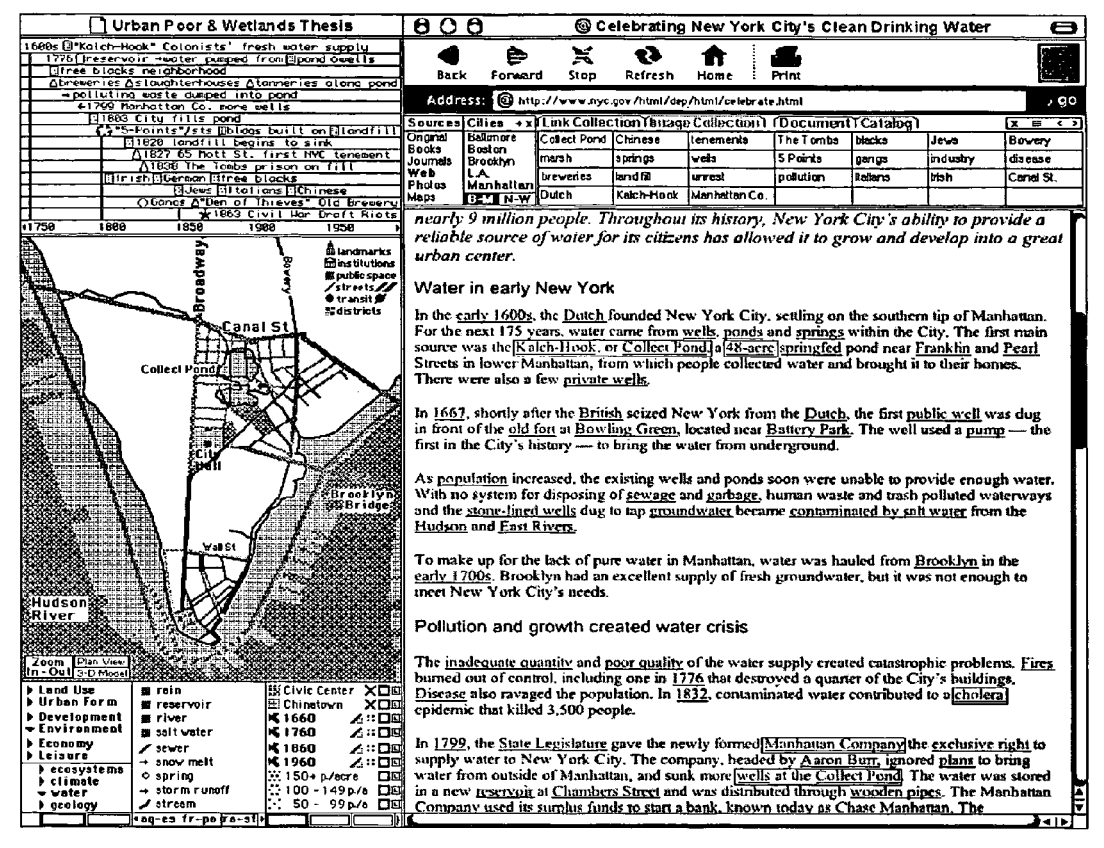

FIGS. 13A-13C show a third exemplar GUI (Graphical User-Interface) layout and its components that is a complex embodiment providing the ability to study and interconnect documents and several maps as part of a research and analytical thought process. Data for the maps is accessed via both symbol-list keys and documents with special control apparatus. The maps are illustrated as a gridded chart or matrix, a graph, and a layered graphic in the form of a geographic map. The described system provides for using the key-enabled document and the symbol-list keys for accessing data and showing its representations in different forms in one or more of the maps.

The display is divided into several parts as shown in FIG. 13A: a control panel area containing a control panel document A with its document navigation system A1 at top right and three map areas 13102, 13103 and 13104. The layout described in FIG. 13A is further detailed in FIG. 13B, with the right hand side of the display having a control panel document 13105 and a map area 13102 in which data from the document is collected. As in the examples illustrated in FIGS. 12A-12E, in FIG. 13B, by engaging a "hot" text link 13201 or image inserted within the document, that text or image or a representation of it 13203 appears in one of the map slots 13202 in map area 13102 and carries data along with it. If adding graphics such as checkmarks beside links is not desirable, pressing a text link and dragging it into the map area 13102 may accomplish collecting the link in the map. Alternatively, this may be accomplished by clicking the link while holding down a designated key on the keyboard, by clicking a button to change modes, or by some other user-input means to override the default of going to the link page upon clicking the link. In this illustrative diagram, the map in map area 13102 is shown as a gridded chart with five over four slots. A document index 6104 related to the document navigation system 13101 and a map index 6205 as described in FIG. 6 6101-6104 are shown to the left of the map area 13102. At the top of the right side, the document title 6 appears along with the document navigation system 7 for searching, finding, and paging through documents. Special control apparatus 8 for manipulating the map appears to the upper right of the map area B for the gridded chart; for instance a slot may be emptied of its contents by dragging it into the "x" or a trash can symbol, the number of slots for collecting links may be extended through scrolling using the back and forth arrowheads, a color palette may be provided so that the user can color code different sets of slots to organize them.

The left hand side of the display diagrammed in FIG. 13B contains two additional maps 13103 and 13104 along with the mapset title 13209. This illustration depicts, in the upper left, a map area 13103 with horizontal slots in the form of a graph and in the lower left, a map area 13104 with a layered graphic. A simple symbol-list key 13210 and a layered symbol-list key 13211, as described in FIGS. 6A-6G and 8A-8H, are shown. The simple symbol-list key 13210 shows the most basic and commonly used data items and special control apparatus. The layered symbol-list key 13211 shown here organizes access to a large information set and collects a layered list of the items that have been selected 13214. The user chooses a topic from the topics list shown in FIG. 12A by clicking on an arrowhead; subtopics for that topic appear below in the layered list as shown in FIG. 12B. This subtopics list has a retrieval bar as shown in FIG. 12C that can be clicked to view additional subtopics. By clicking on a subtopic in the subtopics list shown in FIG. 12B, a layered symbol-list key 13213 for that subtopic appears to its right. Clicking on the subtopic key's retrieval bar, causes additional items to be accessed. Clicking on an item in the subtopic key causes a representation of its data to appear in the map area 13104. As well, the symbols and label for the item appear in the layered selections list 13214 of the key. From this selections list 13214 items can be removed from the map area D and then easily re-shown.

Items that are removed or "hidden" from the map area D may be greyed in the selections list, or otherwise altered graphically so as to signal that they are no longer visible in the map area. A larger number of selections can be shown by clicking on the key extender 13215 that will pop up a longer selections list on top of the document in the control panel 13105. As the user at this point is focusing on the map or maps in the left side of the display, this pop up selections list does not interfere with viewing the document in the control panel. It can be hidden when the user focuses back on the document. As the user focuses on one section of the display, it may be desirable to increase the size of that section temporarily. Devices may be provided that enable the map areas and their maps to be enlarged, such as having the margin lines 13216 between areas draggable so that the user can press on one and move it as if pulling to extend one area into another. Search capabilities such as a "keyword plotter" 13217 may be provided to match text in the document with place names and topics, including themes, people, and objects, that are available to be plotted or inserted into slots in geographic map layers, timelines, grid-formatted image catalogs, or other charts.

These interactive capabilities diagrammed in FIG. 13B are further illustrated in the scenario described in FIG. 13C. In this scenario, a student is researching a thesis about the relationship between the urban poor and wetlands in various cities. She is reading through documents to find data relevant to her research. She collects and reformats data in one or more of her maps, then manipulates the representations to better analyze patterns and relationships between the collected data. The three maps into which she collects interrelated data are 1) a "Link Collector" in a gridded chart; 2) a timeline in a graph with horizontal slots; and 3) a geographic map atlas in a layered graphic.

As part of organizing her documents to be viewed in the control panel document, she has created a list of "Sources" (Original, Books, Journals, Web, Photos, Maps) as her document index. When she clicks on one of the items in the document index for "Sources", its document navigation system appears above. In this case, she has clicked on "Web" and a Web browser bar has appeared. She uses this navigation system to search and locate World Wide Web-based documents. For other source types, an index linked to a set of archives of those source materials might appear in the document navigation system area.

The researcher is searching through documents and collecting data and links in a gridded chart called her "Link Collection" in a method similar to that described in FIGS. 12A, 12C, and 12D. As she searches through sources, the researcher has identified different cities with relevant case studies; therefore, she has organized her Link Collections map index by city. She clicks the + plus sign next to the title "Cities" to add and name a new Link Collection for that city; and its name automatically is inserted alphabetically in the map index, and the retrieval bar is adjusted accordingly showing the initials of the first and last items of the list in each layer of the index. To remove an item from the map index, she presses and drags it to the "X" mark at the upper right of the map index. As she searches, the researcher collects links in her "Link Collection" for a particular city. If she has the Manhattan collection in the map slots and sees a link about Brooklyn, she can click on "Brooklyn" in her map index and the slots will be filled with her Brooklyn collection into which she can save the new Brooklyn link. Then she can go back to the Manhattan collection by clicking the word "Manhattan" in her map index.

The researcher is interested in the historic development of the area of lower Manhattan that originally was a pond and wetlands. At the point illustrated in FIG. 13C, the researcher is going through World Wide Web pages that have been specially formatted with "smart graphics" text or "links" and is viewing a document about the history of New York City's water supply. She has the ability to have the document searched for keywords that can be matched to a list of place names and topics, including themes, people, and objects; if she selects to do so these will be plotted on her geographic map, timeline, or other chart and their symbols brought to the top of her map key. She can also have the control panel document replaced by a "catalog"—a grid or matrix map of images associated with the keywords from which she can view images and choose to collect them into her image collection which she accesses by toggling the tab from "Link Collection" to "Image Collection."

The document is a control panel because it has been specially formatted with "smart graphics" text or "links" related to the set of slotted maps. When the researcher drags hilited text up to a slot, the look of the hilited text in the document changes to show that it has been collected. Not only will the hilited text in the document link to pages of additional information related to the word or phrase; but the link is configured so the additional information or the access path to it can be picked up as the researcher drags the hilited words up to the Link Collection map. Subsequently, by clicking on a slot, the additional information will appear in the control panel document. Additional information may be passed so that it can be used by the system in other ways. It may inform an intelligent agent to search for more web pages like those collected and to bring into the key or layers of the geographic map atlas features related to that which has been collected. The passed information may cause the system to change the content or look of one or more of the maps. For instance, the data passed might include a date that can determine positioning in the timeline or an address or geographic coordinates to determine positioning in a geographic map. The configuration of the link may also include an abbreviated version of the word or phrase so that it will fit into the space provided in the Link Collection map slots. Alternatively, the user may be given the ability to save the link with a label of her own choosing that will best remind her of that particular data set. In addition, instead of collecting one item per slot, the system shown allows the researcher to deposit numerous "smart" graphics links relating to a particular subject into the same slot. The researcher has collected the word "cholera" in the slot named "disease." New terms and subjects such as "Kalch-Hook" and "Manhattan Company" she drags into empty slots to create new categories; the phrase "Manhattan Company" is automatically shortened to "Manhattan Co." to fit the slot. Then she can click on one of these slots to ask to view in the control panel area a particular set of information associated with the collected links, such as: 1) all of that category's links, 2) all of its data, 3) a list of all of the original documents from which the links were collected, or 4) all of the document sections such as paragraphs surrounding those links in the original documents. She may also choose, via the Keyword Plotter, to have her collection of place names and topics, including themes, people, and objects, plotted in the geographic map, time line, or other chart. She may choose to see the images associated with these places and topics in the catalog format in place of the document control panel; she can then toggle between the text document and her image collection by means of the tabs at the top of the Link Collection.

As the researcher progresses in finding relevant data for her research project, she can rearrange the words in her Link Collection slots as she organizes and thinks about the subject matter. In addition, some of the patterns and relationships regarding the collected data can be better understood in relationship to time and space. Therefore the system enables the researcher to have selected data formatted for viewing in a timeline graph and a geographic map. She can drag a "smart graphic" with a date attached from the Link Collection into the timeline. If the "smart graphic" has an address or geographic coordinates attached, it can be dragged into the geographic map; and if it also has a date, it can be located within the correct history map layers. The system enables the researcher to select a symbol and label for the data to be displayed in the timeline and in the geographic map. The timeline and geographic map have data for layers and slots in one or more databases that are accessed through symbol-list keys. The timeline has a scrolling date retrieval bar at the bottom so that the researcher can position and view data for particular eras. To enlarge the timeline, she can press on the right hand edge, the bottom edge, or the bottom right corner to drag and extend the size of the timeline into more of the display area.

The geographic map is connected to an atlas of map layers, data, and images. Keys are provided to access this data. This map has a simple symbol-list key in the upper right corner through which basic features can be easily shown or hidden. At the bottom it has a layered symbol-list key. The researcher has previously brought forth layers including those of population density (persons per acre), historic development, and districts (Civic Center and Chinatown); and they show in the Selections list. The Selections list has special symbols to the right of the map feature symbols through which the researcher can alter how the feature is displayed. For example, the districts default is a solid pattern; but the "X" enables the street pattern to show, the square enables the district outline to show, and the "L" enables labels to show. The researcher can select any combination of formats for each feature. In the map of Manhattan shown in the illustration, the researcher has selected to show the shoreline, water bodies, and streets from 1660 along with the present day major streets with labels and the streets of the Civic Center and Chinatown. From the timeline, she has dragged down the "5-Points" symbol into the map area for the geographic map so that it will be properly located by the software program based on the x,y coordinates of its latitude and longitude in the database. She can then study the district's relationship to the original pond and its subsequent filling for development. She can click on the symbol for the "5-Points" and a gridded-map catalog of historic and present-day images of the district will appear in the control panel area, replacing the document. She can switch from her links- to her images- collection to collect images from the image catalog or from a document by clicking the "Image Collection" tab below the navigation bar. Via other tabs she can hide the image catalog and go back to her document in the control panel. As she has been reading the document, she has learned about reservoirs associated with the pond and she is in the process of looking up "reservoir" in the map atlas key to see the location of the reservoir described in the text. She will then click "Zoom In" to have that portion of the map fill the map area so that she can study that area of the city more closely. She can also click "3-D Model" to view her selected layers draped on top of a three-dimensional view of the area in order to study the data related to topographic changes in elevation.

By the method and system described in this scenario, the researcher smoothly gathers and analyzes data, organizes her conclusions, and then goes on to use the system of interactive charts, graphs, and maps to present and publish the thesis in an interactive format.

Although various embodiments have been described in detail for the purpose of illustration, it is to be understood that such detail is solely for that purpose and that variations can be made therein by those skilled in the art without departing from the spirit and scope of the claimed subject matter.

The invention claimed is:

1. A method comprising:
    displaying a base map;
    displaying an index with the base map, the index concurrently displaying a hierarchy of retrieval bars comprising:
        a first retrieval bar for switching categories of mapsets;
        a second retrieval bar, configured to be updated by a selection in the first retrieval bar, the second retrieval bar for switching subcategories of mapsets;
        a third retrieval bar, configured to be updated by a selection in the second retrieval bar, the third retrieval bar for calling forth clickable lists of mapsets within selected categories and subcategories of mapsets, and
        a fourth retrieval bar, configured to be updated by a selection in the third retrieval bar, the fourth retrieval bar for displaying, in part, designated portions of a list that is currently displayed;
    receiving an index selection in the fourth retrieval bar; and
    responsive to receiving the index selection, displaying associated mapset information.

2. The method of claim 1, wherein said fourth retrieval bar is configured to display multiple letters individual ones of which correspond to list portions that can be displayed.

3. The method of claim 1, wherein said index is configured to cause a map portion to be displayed responsive to a user selection within the index.

4. The method of claim 1 further comprising displaying a context map that shows a present map location within a next higher level map.

5. The method of claim 1 further comprising displaying a context map that shows a present map location within a next higher level map, wherein the context map comprises a toned area outside of which clicking will cause the next higher level map to be displayed.

6. The method of claim 1 further comprising displaying a topic selector configured to retrieve site or object information for a particular topic.

7. The method of claim 6, wherein the topic selector is configured to replace a base key with a topic-related key.

8. The method of claim 6, wherein the topic selector is configured to present a query box.

9. The method of claim 6, wherein the topic selector is configured to present a topic list with a subtopic list.

10. The method of claim 6 further comprising displaying a key having a set of symbols configured to show types of sites or objects positioned on the base map.

11. One or more computer-readable storage media comprising computer-readable instructions which, when executed by a computing device, cause the computing device to perform operations comprising:
    display a base map;
    display an index with the base map, the index concurrently displaying a hierarchy of retrieval bars comprising:
        a first retrieval bar constructed to be populated with a list of categories of mapsets, one of which may be selected;
        a second retrieval bar configured to be populated with a list of one or more subcategories of mapsets determined based on the selected category of mapsets, at least one of which may be selected;
        a third retrieval bar configured to be populated with a list of one or more mapsets determined based on the selected subcategory category of mapsets, at least one of which may be selected, and
        a fourth retrieval bar configured to be populated with an index list based on the selected mapsets, at least one of which may be selected;
    receive an index selection in the fourth retrieval bar; and
    responsive to receiving the index selection, display associated mapset information.

12. The computer-readable storage media of claim 11, wherein said fourth retrieval bar is configured to display multiple letters individual ones of which correspond to list portions that can be displayed.

13. The computer-readable storage media of claim 11, wherein said index is configured to cause a map portion to be displayed responsive to a user selection within the index.

14. The computer-readable storage media of claim 11, wherein the computer-readable instructions are further configured to display a context map that shows a present map location within a next higher level map.

15. The computer-readable storage media of claim 11, wherein the computer-readable instructions, when executed by the computing device, further cause the computing device to display a context map that shows a present map location within a next higher level map, wherein the context map comprises a toned area outside of which clicking will cause the next higher level map to be displayed.

16. The computer-readable storage media of claim 11, wherein the computer-readable instructions, when executed by the computing device, further cause the computing device to display a topic selector configured to retrieve site or object information for a particular topic.

17. The computer-readable storage media of claim 16, wherein the topic selector is configured to replace a base key with a topic-related key.

18. The computer-readable storage media of claim 16, wherein the topic selector is configured to present a query box.

19. The computer-readable storage media of claim 16, wherein the topic selector is configured to present a topic list with a subtopic list.

20. The computer-readable storage media of claim 16, wherein the computer-readable instructions, when executed by the computing device further cause the computing device to display a key having a set of symbols configured to show types of sites or objects positioned on the base map.

21. A system comprising:
    one or more processors;
    a memory;
    a display presenting a base map with an index, the index concurrently displaying:
        a first retrieval bar for switching categories of mapsets;
        a second retrieval bar, configured to be updated by a selection in the first retrieval bar, the second retrieval bar for switching subcategories of mapsets;
        a third retrieval bar, configured to be updated by a selection in the second retrieval bar, the third retrieval bar for calling forth clickable lists of mapsets within selected categories and subcategories of mapsets;
        a fourth retrieval bar, configured to be updated by a selection in the third retrieval bar, the fourth retrieval bar for displaying, in part, designated portions of a list that is currently displayed, the first, second, third, and fourth retrieval bars constituting a hierarchy of retrieval bars; and a control apparatus configured to receive an index selection in the fourth retrieval bar;

wherein the one or more processors are configured to, responsive to receiving the index selection, cause the display to present associated mapset information.

* * * * *